United States Patent
Lee et al.

(10) Patent No.: US 11,921,513 B2
(45) Date of Patent: Mar. 5, 2024

(54) MOVING ROBOT AND MOVING ROBOT SYSTEM

(71) Applicant: LG ELECTRONICS INC., Seoul (KR)

(72) Inventors: Jaehoon Lee, Seoul (KR); Jongjin Woo, Seoul (KR); Dongseong Kim, Seoul (KR); Dongkyun Nam, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 388 days.

(21) Appl. No.: 16/288,903

(22) Filed: Feb. 28, 2019

(65) Prior Publication Data

US 2019/0265718 A1    Aug. 29, 2019

(30) Foreign Application Priority Data

Feb. 28, 2018    (KR) .......................... 10-2018-0024834

(51) Int. Cl.
*G05D 1/02* (2020.01)
*A01D 34/00* (2006.01)
(Continued)

(52) U.S. Cl.
CPC ......... *G05D 1/0225* (2013.01); *A01D 34/008* (2013.01); *B25J 11/0085* (2013.01);
(Continued)

(58) Field of Classification Search
CPC ......... G05D 1/0225; G05D 2201/0208; A01D 34/008
See application file for complete search history.

(56) References Cited

U.S. PATENT DOCUMENTS 6,465,982 B1    10/2002  Bergvall et al.
7,729,801 B2 *   6/2010  Abramson .......... G05D 1/0225
                                                    320/109
(Continued)

FOREIGN PATENT DOCUMENTS

EP    1 047 983    11/2000
EP    2 547 191     1/2013
(Continued)

OTHER PUBLICATIONS

Etindall1, "Preventing Ruts Left by Lawn Mowers," Sep. 13, 2012, etindallturfgrass at Wordpress.com (Year: 2012).*
(Continued)

*Primary Examiner* — Khoi H Tran
*Assistant Examiner* — Aaron G Cain
(74) *Attorney, Agent, or Firm* — KED & ASSOCIATES, LLP

(57) ABSTRACT

A moving robot includes: a boundary signal detector configured to detect a proximity boundary signal generated in a proximity boundary area in which a portion of a first travel area and a portion of a second travel area are proximal to each other; and a controller configured to define a proximity boundary line based on the proximity boundary signal, and control the travelling unit such that the body performs a homing travel which indicates travelling along the proximity boundary line. The moving robot may be included in a system that includes boundary wires to define the first and second travel areas. The system may further include a docking unit to dock with and charge the moving robot.

13 Claims, 14 Drawing Sheets

(51) Int. Cl.
  *B25J 11/00* (2006.01)
  *B25J 13/08* (2006.01)
  *G05D 1/00* (2006.01)

(52) U.S. Cl.
  CPC .......... *B25J 13/086* (2013.01); *G05D 1/0259* (2013.01); *G05D 1/0265* (2013.01); *G05D 2201/0208* (2013.01)

(56) References Cited

U.S. PATENT DOCUMENTS

| | | | |
|---|---|---|---|
| 8,942,862 B2 * | 1/2015 | Markusson | G05D 1/0225 |
| | | | 701/2 |
| 9,072,219 B2 * | 7/2015 | Da Rocha | A01D 34/008 |
| 9,420,741 B2 * | 8/2016 | Balutis | G05D 1/0044 |
| 10,383,499 B2 * | 8/2019 | Fox | A47L 11/4091 |
| 2013/0066484 A1 * | 3/2013 | Markusson | G05D 1/0265 |
| | | | 701/2 |
| 2013/0345922 A1 * | 12/2013 | Biber | A01D 34/008 |
| | | | 701/25 |
| 2014/0379196 A1 * | 12/2014 | Da Rocha | B60L 50/52 |
| | | | 901/1 |
| 2015/0328775 A1 | 11/2015 | Shamlian et al. | |
| 2017/0079202 A1 * | 3/2017 | Balutis | B25J 9/1674 |
| 2018/0135325 A1 * | 5/2018 | Schloss | E04H 4/1654 |

FOREIGN PATENT DOCUMENTS

| | | |
|---|---|---|
| EP | 2 853 975 | 4/2015 |
| EP | 2 945 037 | 11/2015 |
| JP | 2005-531832 | 10/2005 |
| KR | 10-2013-0092453 | 8/2013 |
| KR | 10-2015-0125508 | 11/2015 |
| WO | WO 99/38056 | 7/1999 |
| WO | WO 2011/115535 | 9/2011 |

OTHER PUBLICATIONS

European Search Report dated Jun. 28, 2019 issued in EP Application No. 19159954.7.
Korean Office Action dated Aug. 18, 2019 issued in KR Application No. 10-2018-0024834.

* cited by examiner

MOVING ROBOT AND MOVING ROBOT SYSTEM

CROSS-REFERENCE TO RELATED APPLICATION

This application claims priority under 35 U.S.C. § 119 to Korean Application No. 10-2018-0024834 filed on Feb. 28, 2018, whose entire disclosure is hereby incorporated by reference.

BACKGROUND

1. Field

The present disclosure broadly relates to a moving robot that returns to a docking station along an efficient route while avoiding potential obstacles on the ground, and a related moving robot system.

2. Background

Robots may have industrial use, such as applications in the automation of production operations. Certain types of robots may be widely used, for example, in the medical industry and the aerospace industry. Domestic robots may be used for performing household chores. A type of robot may be capable of traveling autonomously on its own and may be referred to as a moving robot (or an autonomous robot). An example of a moving robot used in a residential environment is a lawn mower robot that may travel autonomously to cut grass or other plant in a lawn.

For a moving robot travelling in an indoor space, a movement area may be typically restricted by at least one wall, furniture, and/or other obstacle, whereas for a lawn mower robot or other moving robot travelling an outdoor space, an exterior movement area may be set in advance to prevent the moving robot from leaving a desired region. In addition, an external movement area may be further restricted based on a function to be performed by a moving robot, such as limiting a lawn mower robot to travelling in a grassy area to be mowed.

Korean Patent Application Publication No. 2015-0125508 (published on Nov. 9, 2015) describes that a wire may be installed in a lawn for setting an area to be traveled by a lawn mower robot in the lawn. The lawn mower robot may sense a magnetic field formed by currents flowing by the wire and may move within the area set by the wire based on sensing the magnetic field.

This and other lawn mowers robot may not able to accurately recognize a position of a charging station, but instead, may simply travel in a path along a wire or other boundary to find the position of the charging station and to dock with the with charging station. However, as the lawn mower robot travels along the boundary wire to find the position of the charging station, travelling distances of the lawn mower robot to the charging station may be unnecessarily long, and a battery life of the lawn mower may be reduced. For example, the lawn mower may initially move away from the charging station and may travel some distance along a boundary before returning to the charging station.

In addition, because the moving robot may repeatedly move along a common route along the boundary (e.g., near a wire border) when moving back to the charging station, the moving robot may cause ruts, indentations, pits, or other obstacles to be formed on the ground along the boundary. These obstacles formed by the lawn mower robot may interrupt the movement of the lawn mower robot when travelling to the charging station on the return route along the boundary.

Installation of one or more additional sensors in the lawn mower robot to recognize the position of the charging station may add undesirable complexity and costs to the lawn mowing robot. Furthermore, collecting and processing the data from the additional sensor may reduce a battery life.

The above reference is incorporated by reference herein where appropriate for appropriate teachings of additional or alternative details, features and/or technical background.

BRIEF DESCRIPTION OF THE DRAWINGS

The embodiments will be described in detail with reference to the following drawings in which like reference numerals refer to like elements wherein.

DETAILED DESCRIPTION

Figure 1:
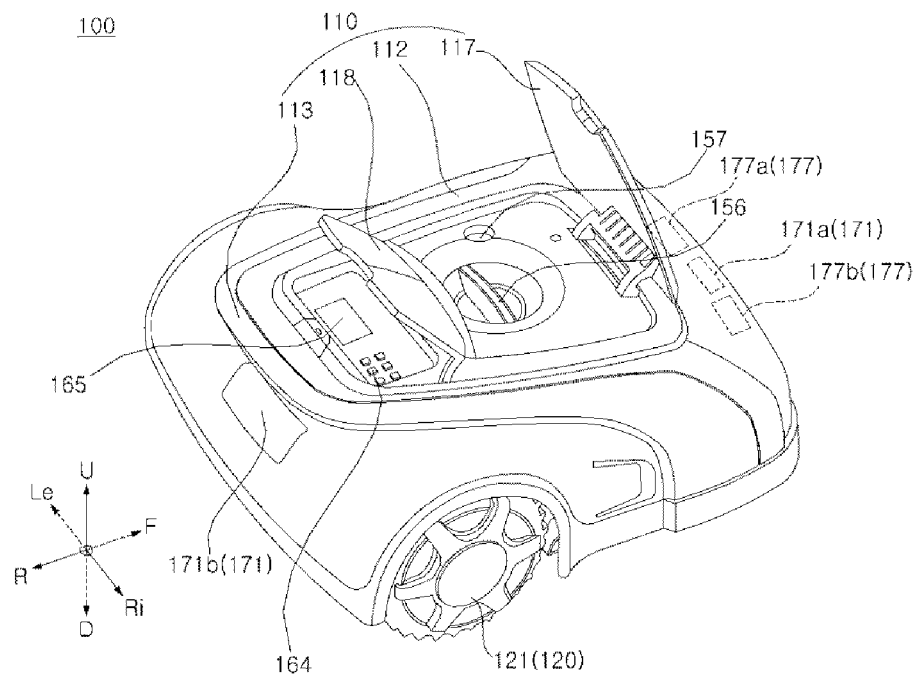
FIG. 1 is a perspective view of a moving robot according to an embedment of the present disclosure.
Figure 2:
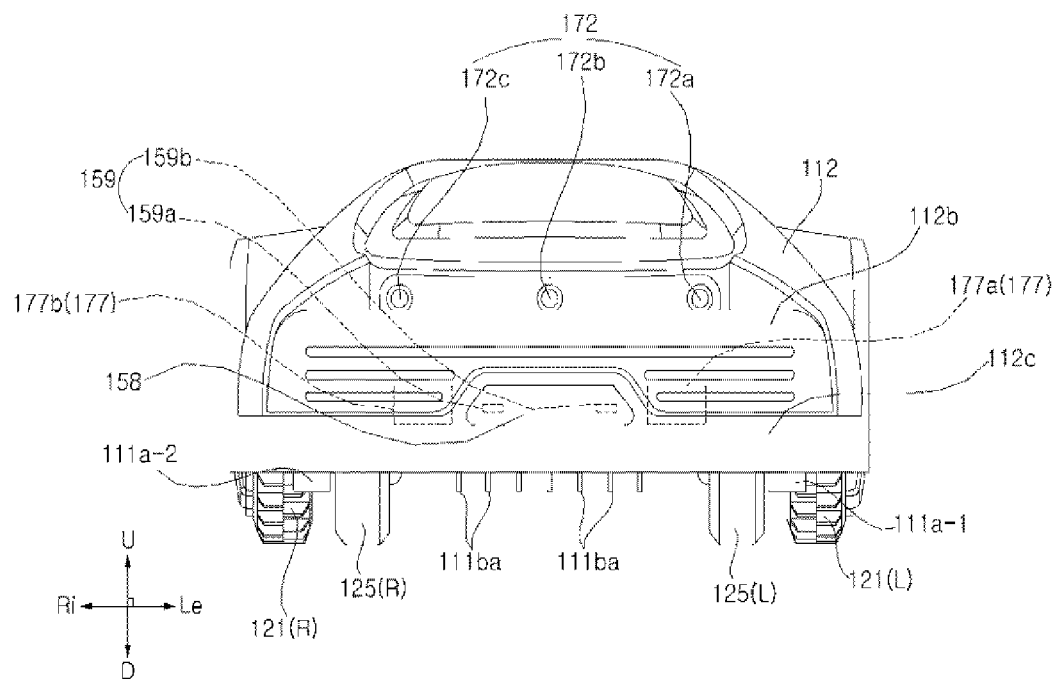
FIG. 2 is a front view of the moving robot of FIG. 1.
Figure 3:
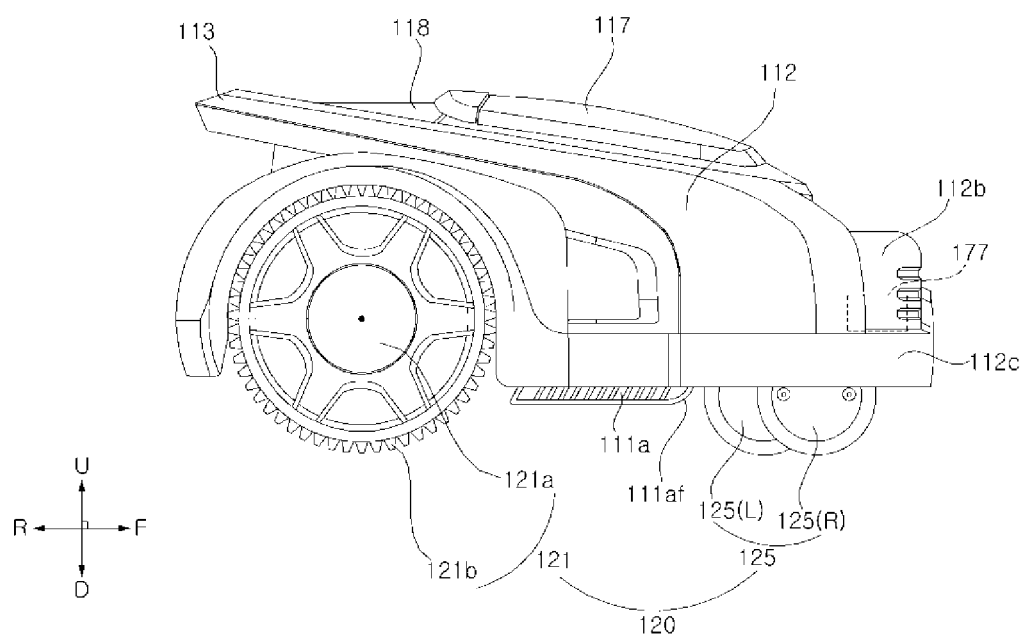
FIG. 3 is a right side view of the moving robot shown in FIG. 1.
Figure 4:
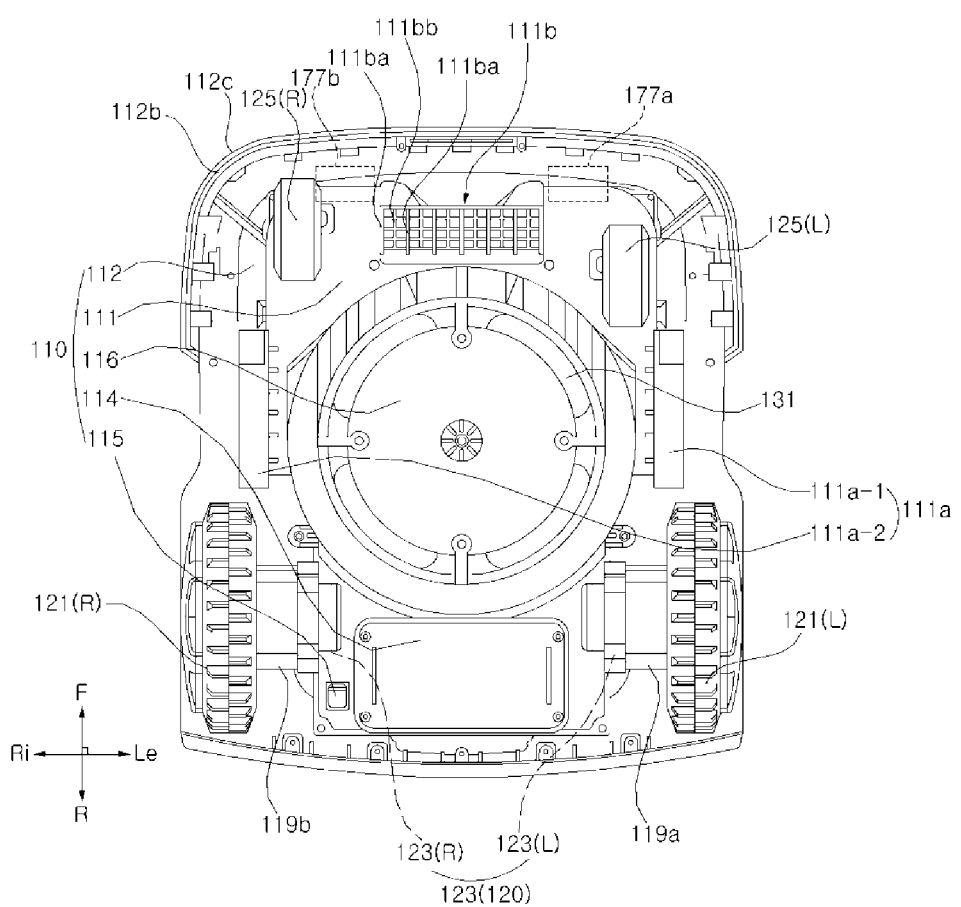
FIG. 4 is a bottom view of the moving robot shown in FIG. 1.

Hereinafter, a moving robot 100 is described as being a lawn mower robot but the present disclosure is not necessarily limited thereto. For example, the principles described herein may be applied to a moving robot traveling in an interior region or in other environments and/or performing other functions, such as autonomous cleaning robot.

With reference to FIGS. 1 to 4, a moving robot 100 may include a body 110 that partially defines an exterior of the moving robot 100. The body 110 also may form an inner space within the moving robot 100 to accommodate one or more components. The moving robot 100 may include a travelling unit 120 that causes the body 110 to move along a travel surface. The moving robot 100 may include a task execution unit (or task module) 130 that may include one or more components that may be used to perform a predetermined task, such as a blade 131 to mow grass.

The body 110 may include a frame 111 to which a driving motor module 123, which will be described later, may be fixed. A blade motor 132, which will be described later, may also be fixed to the frame 111. The frame 111 may further be fixed to or otherwise support a battery, which will be described later. The frame 111 provides a structure which supports even other components which are not mentioned herein. The frame 111 may be supported by an auxiliary wheel 125 and a driving wheel 121.

The body 110 may include a lateral blocking part (or lateral shield) 111a which may help to prevent a user's finger from inadvertently contacting the blade 131 from a side of the body 110. The lateral blocking part 111a may be fixed to the frame 111. The lateral blocking part 111a may project downward, compared to a button surface or another part of the frame 111. The lateral blocking part 111a may be positioned to cover an upper side of a space between the driving wheel 121 and the auxiliary wheel 125. In one example, a pair of lateral blocking parts 111a-1 and 111a-2 may be positioned on the left and right sides to the blade 131. The lateral blocking part 111a may be spaced a predetermined distance apart from the blade 131.

In one implementation, a front surface 111af of the lateral blocking part 111a may be formed in a substantially rounded shape. For example, the front surface 111af may be bent in a rounded manner upwardly in a forward direction from a bottom surface of the lateral blocking part 111a. Due to the rounded shape of the front surface 111af, the lateral blocking parts 111a may be able to easily go over an obstacle of a predetermined height or less when the moving robot 100 moves forward.

The body 110 may include a front blocking part (or front shield) 111b which may help to prevent a user's finger from contacting the blade 131 from a front of the body 110. The front blocking part 111b may be fixed to the frame 111. The front blocking part 111b may be positioned to partially cover an upper side of a space between a pair of auxiliary wheels 125(L) and 125(R).

The front blocking part 111b may include a projected rib 111ba that projects downward compared to a bottom surface of the frame 111. The projected rib 111ba may extend in a front-rear direction. An upper portion of the projected rib 111ba may be fixed to the frame 111, and a lower portion of the projected rib 111ba may form a free end.

A plurality of projected ribs 111ba may be spaced apart in a left-right direction from each other. The plurality of projected ribs 111ba may be positioned in parallel to each other. A gap may be formed between two adjacent projected ribs 111ba.

A front surface of the projected ribs 111ba may be formed to have a round shape. The front surface of the projected rib 111ba may form a surface that is bent in a round manner upwardly in a forward direction from a bottom surface of the projected rib 111ba. Due to the rounded shape of the front surface of the projected rib 111ba, the projected rib 111ba may be able to go over an obstacle of a predetermined height or lower when the moving robot 100 moves forward.

The front blocking part 111b may include an auxiliary rib 111bb which may reinforce a rigidity of the projected ribs 111ba or other component. The auxiliary ribs 111bb for reinforcing rigidity of the front blocking part 111b may be positioned between upper portions of two adjacent projected ribs 111ba. The auxiliary rib 111bb may be projected downward and may have an extended lattice shape. A lower end of the projected rib 111ba may be positioned lower than a lower end of the auxiliary rib 111bb.

In the frame 111, a caster which supports the auxiliary wheel 125 may be rotatably positioned. The caster may be positioned to be rotatable with respect to the frame 111. The caster may be positioned to be rotatable about a vertical axis. The caster may be positioned in a lower side of the frame 111. The caster may be provided as a pair of casters corresponding, respectively, to the pair of auxiliary wheels 125.

The body 110 may include a case 112 which covers the frame 111 from above. The case 112 may define a top surface and front/rear/left/right surfaces of the moving robot 100. The body 110 may include a case connection part or connector (not shown) which fixes the case 112 to the frame 111. An upper portion of the case connection part may be fixed to the case 112, and the case connection part may be positioned to be movable with respect to the frame 111. The case connection part may be movable only upwardly and downwardly with respect to the frame 111. The case connection part may be movable in a predetermined range. The case connection part may move integrally with the case 112. Accordingly, the case 112 may be movable with respect to the frame 111.

The body 110 may include a bumper 112b which is positioned at a front of the body 110. The bumper 112b may absorb an impact upon collision of the body 110 with an external obstacle. At a front surface of the bumper 112b, a bumper groove may be formed, and the bumper groove may be recessed rearward and elongated in a left-right direction. The bumper groove may be provided as a plurality of bumper grooves that are spaced apart from each other in an upward-downward direction.

The front surface and the left and right surfaces of the bumper 112b may be connected. For example, the front surface and the left and right surfaces of the bumper 112b may be connected to form a substantially rounded shaped.

The body 110 may include an auxiliary bumper 112c which may be positioned to wrap around or otherwise be adjacent to (e.g., within a prescribed distance of) an exterior surface of the bumper 112b. The auxiliary bumper 112c may be coupled to the bumper 112b. The auxiliary bumper 112c may contact lower portions of the front, left, and right surfaces of the bumper 112b. The auxiliary bumper 112c may cover the lower half portions of the front, left, and right surfaces of the bumper 112b.

In some implementations, the front surface of the auxiliary bumper 112c may be positioned ahead of the front surface of the bumper 112b. The auxiliary bumper 112c may form a surface projected from a surface of the bumper 112b. The auxiliary bumper 112c may be formed of a material which is advantageous in absorbing impact, such as rubber. The auxiliary bumper 112c may be formed of a flexible material.

The frame 111 may be provided with a movable fixing part (not shown) to which the bumper 112b is fixed, such as a brace or shock absorber. The movable fixing part may be projected upward of the frame 111. The bumper 112b may be fixed to an upper portion of the movable fixing part.

The bumper 112b may be positioned movable in a predetermined range with the frame 111. The bumper 112b may be fixed to the movable fixing part and thus movable integrally with the movable fixing part. The movable fixing part may be positioned to be movable with respect to the frame 111. The movable fixing part may be rotatable about a virtual rotation axis in a predetermined range with the frame 111. Accordingly, the bumper 112b may be movable integrally with the movable fixing part with respect to the frame 111.

The body 110 may include a handle 113. The handle 113 may be positioned at the rear of the case 112. The body 110 also may include a battery slot 114 into and from which a battery (not shown) may be inserted and separated. The battery slot 114 may be positioned at a bottom surface of the frame 111 or at the rear of the frame 111. The body 110 may further include a power switch 115 to turn on/off power of the moving robot 100. The power switch 115 may be positioned at the bottom surface of the frame 111.

The body 110 may include a blade protector 116 which covers at least a portion of the lower side of the central portion of the blade 131. The blade protector 116 may be provided to expose centrifugal portions of blades of the blade 131 while hiding the central portion of the blade 131.

The body 110 may include a first opening and closing door 117 which is configured to open a portion in which a height adjuster 156 and a height indicator 157 may be positioned. The first opening and closing door 117 may be hinge-coupled to the case 112 to be opened and closed. The first opening and closing door 117 may be positioned at a top surface of the case 112. The first opening and closing door 117 may be formed in a plate shape, and, when closed, may cover the top of the height adjuster 156 and the height indicator 167.

The body 110 may include a second opening and closing door 118 which opens and closes a portion of the body in which a display module 165 and an input unit 164 may be provided. The second opening and closing door 118 may be hinge-coupled to the case 112 to be opened and closed. The second opening and closing door 118 may be positioned in a top surface of the case 112. The second opening and closing door 118 may be positioned behind (e.g., further from a front of the body) the first opening and closing door 117. The second opening and closing door 118 may be formed in a substantially plate shape, and, when closed, may cover the display module 165 and the input unit 164.

An available opening angle of the second opening and closing door 118 may be predetermined to be smaller than an available opening angle of the first opening and closing door 117. In doing this, even when the second opening and closing door 118 is opened, a user may be able to easily open the first opening and closing door 117 and manipulate the height adjuster 156. In addition, even when the second opening and closing door 118 is opened, the user may be able to visually check content of the height display 157. For example, the available opening angle of the first opening and closing door 117 may be about 80 to 90 degrees with reference to the closed state of the first opening 117, while the available opening angle of the second opening and closing door 118 may be about 45 to 60 degrees with reference to the closed state of the second opening and closing door 118.

A rear of the first opening and closing door 117 may be lifted upward from a front thereof to thereby open the first opening and closing door 117, and a rear of the second opening and closing door 118 may be lifted upward from a front thereof to thereby open the second opening and closing door 118. In doing so, even while the lawn mower 100 moves forward, a user located in an area behind the lawn mower 100, which may be referred to as a "safe" area since the blade 131 being away from this area, may be able to open and close the first opening and closing door 117 and the second opening and closing door 118. In addition, in doing so, opening of the first opening and closing door 117 and opening of the second opening and closing door 118 may be prevented from intervening each other.

The first opening and closing door 117 may be rotatable with respect to the case 112 about a rotation axis which extends from the front of the first opening and closing door 117 in a left-right direction. The second opening and closing door 118 may be rotatable with respect to the case 112 about a rotation axis which extends from the front of the second opening and closing door 118 in the left-right direction.

The body 110 may include a first motor housing 119a which accommodates a first driving motor 123(L), and a second motor housing 119b which accommodates a second driving motor 123(R). The first motor housing 119a may be fixed to the left side of the frame 111, and the second motor housing 119b may be fixed to the right side of the frame 111. A right end of the first motor housing 119a may be fixed to the frame 111. A left end of the second motor housing 119b is fixed to the frame 111.

The first motor housing 119a may be formed in a substantially cylindrical shape that axially extends in the left-right direction. The second motor housing 119b may be formed in a cylindrical shape that that axially extends in the left-right direction.

The traveling part 120 may include the driving wheel 121 that may be rotated by a driving force generated by the driving motor module 123. The traveling part 120 may include at least one pair of driving wheels 121 which may be rotated by a driving force generated by the driving motor module 123. The driving wheel 121 may include a first wheel 121(L) and a second wheel 121(R), which may be provided, respectively, on the left and right sides of the body and may be rotatable independently of each other. The first wheel 121(L) may be positioned on the left side, and the second wheel 121(R) may be positioned on the right side. The first wheel 121(L) and the second wheel 121(R) may be spaced apart in a left-right direction from each other. The first wheel 121(L) and the second wheel 121(R) may be positioned at a lower side at the rear of the body 110.

The first wheel 121(L) and the second wheel 121(R) may be rotatable independently of each other so that the body 110 may rotate and/or move forward relative to a ground surface. For example, when the first wheel 121(L) and the second wheel 121(R) rotate at the same speed, the body 110 may move relatedly straight forward relative to the ground surface. In another example, when a rotation speed of the first wheel 121(L) is faster than a rotation speed of the second wheel 121(R) or when a rotation direction of the first wheel 121(L) and a rotation direction of the second wheel 121(R) are different from each other, the body 110 may rotate or otherwise turn against the ground surface.

The first wheel 121(L) and the second wheel 121(R) may be formed to be larger in a radial direction than the auxiliary wheel 125. A shaft of the first driving motor 123(L) may be fixed to the center of the first wheel 121(L), and a shaft of the second driving motor 123(R) may be fixed to the center of the second wheel 121(R).

The driving wheel 121 may include a wheel circumference part 121b which contacts the ground surface. For example, the wheel circumference part 121b may be a tire. In the wheel circumference part 121b, a plurality of projections for increasing a frictional force with the ground surface may be formed. For example, the projections may extend outwards in a radial direction.

The driving wheel 121 may include a wheel fame, which may fix the wheel circumference part 121b and may receive a driving force for the motor 123. A shaft of the motor in driving motor module 123 may be fixed to the center of the wheel frame to receive a rotation force. The wheel circumference part 121b may be positioned to surround a circumference of the wheel frame.

The driving wheel 121 may include a wheel cover 121a which is positioned to cover an exterior surface of the wheel frame. With reference to the wheel frame, the wheel cover 121a may be positioned in a direction opposite to a direction in which the driving motor module 123 is positioned. The wheel cover 121a may be positioned substantially at the center of the wheel circumference part 121b.

The traveling part 120 may include the driving motor module 123 which generates a driving force. The traveling part 120 may include the driving motor module 123 which provides a driving force for the driving wheel 121. The driving motor module 123 may include the first driving motor 123(L) which provides a driving force for the first wheel 121(L), and the second driving motor 123(R) which provides a driving force for the second wheel 121(R). The first driving motor 123(L) and the second driving motor 123(R) may be spaced apart in a left-right direction from each other. The first driving motor 123(L) may be positioned on the left side of the second driving motor 123(R)

The first driving motor 123(L) and the second driving motor 123(R) may be positioned at a lower side of the body 110. The first driving motor 123(L) and the second driving motor 123(R) may be positioned at the rear of the body 110. The first driving motor 123(L) may be positioned on the right side of the first wheel 121(L), and the second driving motor 123(R) may be positioned on the left side of the second wheel 121(R). The first driving motor 123(L) and the second driving motor 123(R) may be fixed to the body 110.

The first driving motor 123(L) may be positioned inside the first motor housing 119a, with an associated motor shaft being projected leftward. The second driving motor 123(R) may be positioned inside the second motor housing 119b, with an associated motor shaft being projected rightward. In this embodiment, the first wheel 121(L) and the second wheel 121(R) may be connected to a rotation shaft of the first driving motor 123(L) and a rotation shaft of the second driving motor 123(R), respectively. Alternatively, a component of a shaft or similar device may be connected to the first wheel 121(L) and the second wheel 121(R). Alternatively, a rotation force of the motor 123(L) or 123(R) may be transferred to the wheel 121a or 121b by a gear or a chain.

The traveling unit 120 may include the auxiliary wheel 125 which supports the body 110 together with the driving wheel 121. The auxiliary wheel 125 may be positioned ahead of the blade 131. The auxiliary wheel 125 may be a wheel which does not receives a driving force generated by a motor (e.g., from driving motor module 123), and the auxiliary wheel 125 may support the body 110 against the ground surface. The caster supporting a rotation shaft of the auxiliary wheel 125 may be coupled to the frame 111 to be rotatable about a vertical axis. A first auxiliary wheel 125(L) may be positioned on the left side, and a second auxiliary wheel 125(R) may be positioned on the right side.

The task execution unit 130 may be provided to perform a predetermined task. The task execution unit 120 is positioned at the body 110. In one example, the task execution unit 130 may be provided to perform a task in an environment, such as cleaning or lawn mowing. In another example, the task execution unit 130 may be provided to perform a task related to an object, such as transferring an object or finding an object. In yet another embodiment, the task execution unit 130 may perform a security function, such as sensing an intruder or a dangerous situation in the surroundings.

In one embodiment, the task execution unit 130 may be described as performing a function of mowing lawn, but as previously described, there may be various types of task performed by the task execution unit 120 and not limited to this embodiment. The task execution unit 130 may include the blade 131 which are rotatably provided to mow lawn. The task execution unit 130 may also include a blade motor 132 which provides a rotation force for the blade 131.

The blade 131 may be positioned between the driving wheel 121 and the auxiliary wheel 125. The blade 131 may be positioned on a lower side of the body 110. The blade 131 may be exposed from the lower side of the body 110 such that the blade 131 may contact and cut grass under the body 110. The blade 131 may mow a lawn by rotating about a rotation shaft which extends in an upward-downward direction.

A blade motor 132 may be positioned ahead of the first wheel 121(L) and the second wheel 121(R). The blade motor 132 may be positioned at a lower side of the center in the inner space of the body 110. The blade motor 132 may be positioned at the rear of the auxiliary wheel 125. The blade motor 132 may be positioned in a lower side of the body 110. A rotational force of the motor axis is transferred to the blade 131 using a structure such as a gear.

The moving robot 100 may include a battery (not shown) which provides power for the driving motor module 123, such as providing power to the first driving motor 123(L) and/or the second driving motor 123(R). The battery may provide power for the blade motor 132. The battery may provide power to a controller 190, an azimuth angle sensor 176, and an output unit 165, to be described below. The battery may be positioned in a lower side of the rear in the indoor space of the body 110.

The moving robot 100 is able to change a height of the blade 131 from the ground, such as to change a lawn cutting height. The moving robot 100 may include the height adjuster 156 by which a user is able to change a height of the blade 131. The height adjuster 156 may include a rotatable dial or other user interface (such as a button, switch, or touch screen) to receive a user instruction, and a user may change the height of the blade 131 by rotating the dial.

The moving robot 100 may include the height indicator 157 which displays a degree of the height of the blade 131. When the height of the blade 131 is changed upon manipulation of the height adjuster 156, the height displayed by the height display 157 may be also changed. For example, the height display 157 may display a height value of grass that is expected after the moving robot 100 mows lawn with a given height of the blade 131.

The moving robot 100 may include a docking insertion part (or docking insertion recess) 158 which is connected to a portion of a docking device (also referred to herein as a docking station) 200 when the moving robot 100 is docked to the docking device 200. The docking insertion part 158 may be recessed so that a docking connection part (or docking connection extension) 210 of the docking device 200 may be inserted into the docking insertion part 158. The docking insertion part 158 may be positioned at the front surface of the body 110. Due to connection of the docking insertion part 158 and the docking connection part 210, the moving robot 100 may be guided to a correct position when charged.

The moving robot 100 may include a charging counterpart terminal 159 which is positioned at a position to contact a charging terminal 211, which will be described later, when the docking connection part 210 is inserted into the docking insertion part 158. The charging counterpart terminal 159 may include a pair of charging counterpart terminals (e.g., a charged terminal and a ground germinal) which provided at positions corresponding to a pair of charging terminals 211 (211a, 211b). In one example, the pair of charging counterpart terminals 159a and 159b may be positioned on the left and right sides of the docking insertion part 158.

A terminal cover (not shown) to openably/closably cover the pair of charging terminals 211 (211a, 211b) may be provided. While the moving robot 100 travels, the terminal cover may cover at least one of the docking insertion part 158 or the pair of charging terminals 211 (211a, 211b). When the moving robot 100 is connected with the docking device 200, the terminal cover may be opened, and therefore, the docking insertion part 158 and the pair of charging terminals 211 (211a, 211b) may be exposed.

Figure 5:
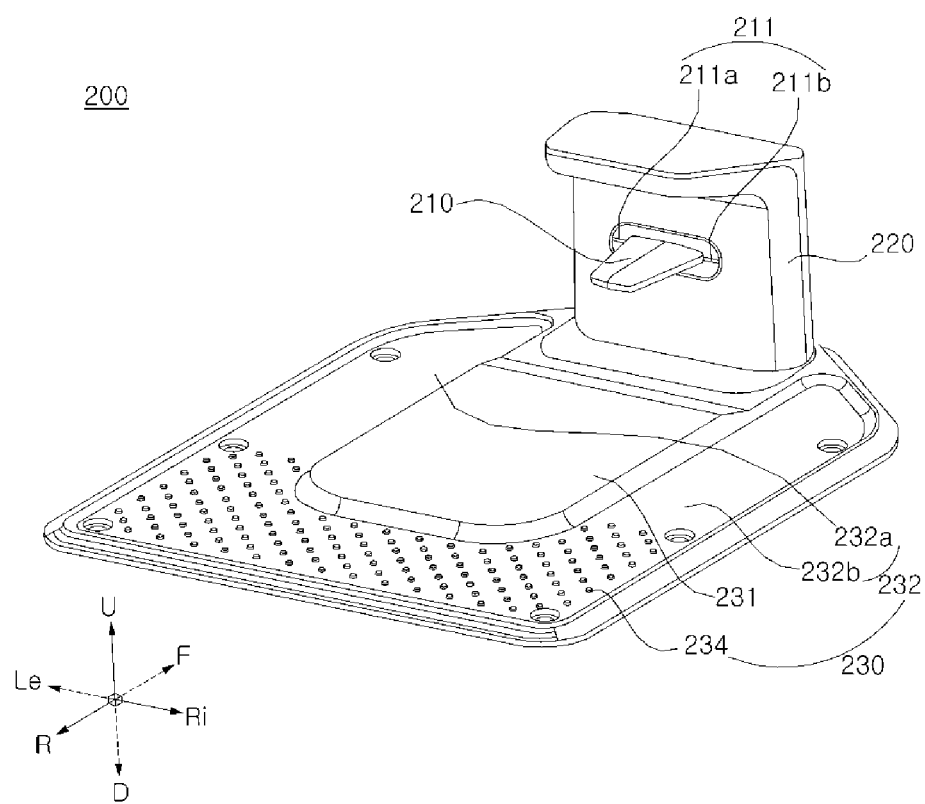
FIG. 5 is a perspective view of a docking device for docking the moving robot shown in FIG. 1 according to an embedment of the present disclosure.
Figure 6:
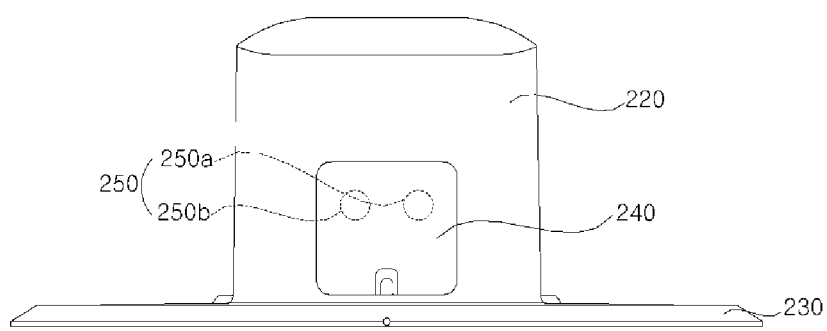
FIG. 6 is a front view of the docking device shown in FIG. 5.
Figure 6:
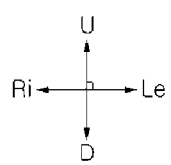

Meanwhile, referring to FIGS. 5 to 6, the docking device 200 may include a docking base 230 positioned at a ground level, and a docking support 220 may be projected upwardly from the front of the docking base 230. The docking base 230 defines a surface parallel to a horizontal direction. The docking base 230 is in a plate shape on which the moving robot 100 is able to be seated. The docking support 220 extends in a direction that crosses the horizontal direction on the docking base 230.

The docking device 200 may include the docking connection part 210 which may be inserted into the docking insertion part 158 to charge the moving robot 100. The docking connection part 210 may be projected rearward from the docking support 220. The docking connection part 210 may be formed to have a vertical thickness smaller than a horizontal thickness. A horizontal width of the docking connection part 210 may be narrowed toward the rear. As viewed from above, the docking connection part 210 may have a substantially trapezoidal shape. The docking connection part 210 may be vertically symmetrical. The rear of the docking connection part 210 may form a free end, and the front of the docking connection part 210 may be fixed to the docking support 220. The rear of the docking connection part 210 may be formed in a substantially round shape.

When the docking connection part 210 is inserted into the docking insertion part 158, charging of the moving robot 100 by the docking device 200 may be performed. The docking device 200 may include the charging terminal 211 to charge the moving robot 100. As the charging terminal 211 and the charging counterpart terminal 159 of the moving robot 100 are brought into contact with each other, charging power may be supplied from the docking device 200 to the moving robot 100.

The charging terminal 211 may include a contact surface facing rearward, and the charging counterpart terminal 159 may include a contact counterpart surface facing forward. As the contact surface of the charging terminal 211 is brought into contact with the contact counterpart surface of the charging counterpart terminal 159, power of the docking device 200 may be provided to the moving robot 100.

The charging terminal 211 may include a pair of charging terminals 211 (211a, 211b) which may form a positive polarity (+) and a negative polarity (−), respectively. The first charging terminal 211 (211a) may be provided to come into contact with the first charging counterpart terminal 159a, and the second charging terminal 211 (211b) may be provided to come into contact with the second charging counterpart terminal 159b.

The pair of charging terminals 211 (211a, 211b) may be positioned with the docking connection part 210 therebetween. The pair of charging terminals 211 (211a, 211b) may be positioned on the left and right sides of the docking connection part 210.

The docking base 230 may include a wheel guard 232 on which the driving wheel 121 and the auxiliary wheel 125 of the moving robot 100 may be positioned. The wheel guard 232 may include a first wheel guard 232a which guides movement of the first auxiliary wheel 125(L), and a second wheel guard 232b which guides movement of the second auxiliary wheel 125(R). Between the first wheel guard 232a and the second wheel guard 232b, there may be a central base 231 which may be convex upwardly. The docking base 230 may include a slip prevention part (or slip prevention protrusion) 234 to help prevent slipping of the first wheel 121(L) and the second wheel 121(R). The slip prevention part 234 may include a plurality of projections which are projected upwardly to contact the wheels 121.

Meanwhile, a boundary wire 290 related to setting a boundary of a travel area of the moving root 100 may be provided. The boundary wire 290 may generate a predetermined boundary signal based on a received current. By detecting the boundary signal, the moving robot 100 is able to recognize the boundary of the travel area set by the boundary wire 290. For example, as a predetermined current is flows along the boundary wire 290, a magnetic field may be generated around the boundary wire 290. The generated magnetic field may correspond to the aforementioned boundary signal. As an alternating current with a predetermined pattern of change flow in the boundary wire 290, a magnetic field generated around the boundary wire 290 may change corresponding to the predetermined pattern of change of the current. Using a boundary signal detector 177 to detect a magnetic field, the moving robot 100 may recognize that the moving robot 100 has approached the boundary wire 290 within a predetermined range, and accordingly, the moving robot 100 may travel based on a travel area within a boundary set by the boundary wire 290.

The boundary wire 290 may generate a magnetic field in a direction that is distinguishable from a direction of a magnetic field generated by a reference wire 270. For example, the boundary wire 290 may be positioned substantially parallel to a horizontal plane. In this description, being "substantially parallel" may include an engineering understanding of a parallel state, which may include a certain level of error to a mathematically perfect parallel state.

The docking unit 200 may play a role related to transferring a predetermined current or power to the boundary wire 290. The docking device 200 may include a wire terminal 250 connected to the boundary wire 290. Both ends of the boundary wire 290 may be connected to a first wire terminal 250a and a second wire terminal 250b. Through the connection between the boundary wire 290 and the wire terminal 250, a power supply of the docking device 200 may supply a current or power to the boundary wire 290.

The boundary wire 290 may include a first boundary wire 291 defining a boundary of a first travel area, and a second boundary wire 292 defining a boundary of a second travel area. In this example, the entire area bounded by the wire 290 may be divided into two distinct areas for a random homing travel route. One end of the first boundary wire 291 and one end of the second boundary wire 292 may be connected to the first wire terminal, and the other end of the first boundary wire 292 and the other end of the second boundary wire 292 may be connected to the second wire terminal. In another example, the opposite connections may be implemented.

The wire terminal 250 may be positioned at the front (F) of the docking device 200. That is, the wire terminal 250 may be positioned at a position opposite to a direction in which the docking connection part 210 is projected. The wire terminal 250 may be positioned in the docking support 220. The first wire terminal 250*a* and the second wire terminal 250*b* may be spaced apart in a left-right direction from each other.

The docking device 200 may include a wire terminal opening and closing door 240 which may openably/closably cover the wire terminal 250. The wire terminal opening and closing door 240 may be positioned at the front (F) of the docking support 220. The wire terminal opening and closing door 240 may be hinge-coupled to the docking support 220 to be opened and closed by rotation around the hinge.

Meanwhile, the reference wire 270 to allow the moving robot 100 to recognize a position of the docking unit 200 may be provided. The reference wire 270 may generate a predetermined docking position signal, as described below. The moving robot 100 may recognize the position of the docking device 200 using the reference wire 270 by sensing the docking position signal generated by the reference wire 270 and may return back to the recognized position of the docking unit 200 in response to a return command or in response to the need of being charged (e.g., a stored power level is less than a threshold). Such a position of the docking unit 200 may be a reference point for travelling of the moving robot 100.

The reference wire 270 may be formed of a conductive material to allow a current to flow. The reference wire 270 may be connected to a power supply of the docking unit 200, which will be described later. For example, a predetermined current may be allowed to flow along the reference wire 270, so that a magnetic field is generated around the reference wire 270. The generated magnetic field may correspond to a reference magnetic field signal. As an alternating current with a predetermined pattern of change may be allowed to flow in the reference wire 270, a magnetic field generated around the reference wire 270 may change with the predetermined pattern of change. Using the magnetic field signal detector 177 to detect the magnetic field, the moving robot 100 may recognize when it has approached the reference wire 270 within a predetermined range, and, in doing so, the moving robot 200 may be able to return back to the position of the docking unit 200 based on detecting the reference wire 270.

The reference wire 270 may generate a magnetic field in a direction that may be distinguishable from a direction of a magnetic field generated by the boundary wire 290. For example, the reference wire 270 may extend in a direction that crosses a horizontal direction. For example, the reference wire 270 may extend at least partially in an upward-downward (e.g., vertical) direction that may be orthogonal to the horizontal direction associated with the boundary wire 290. For example, the reference wire 270 may be installed in the docking unit 200. The reference wire 270 may be positioned at various positions in the docking unit 200.

Figure 7A:
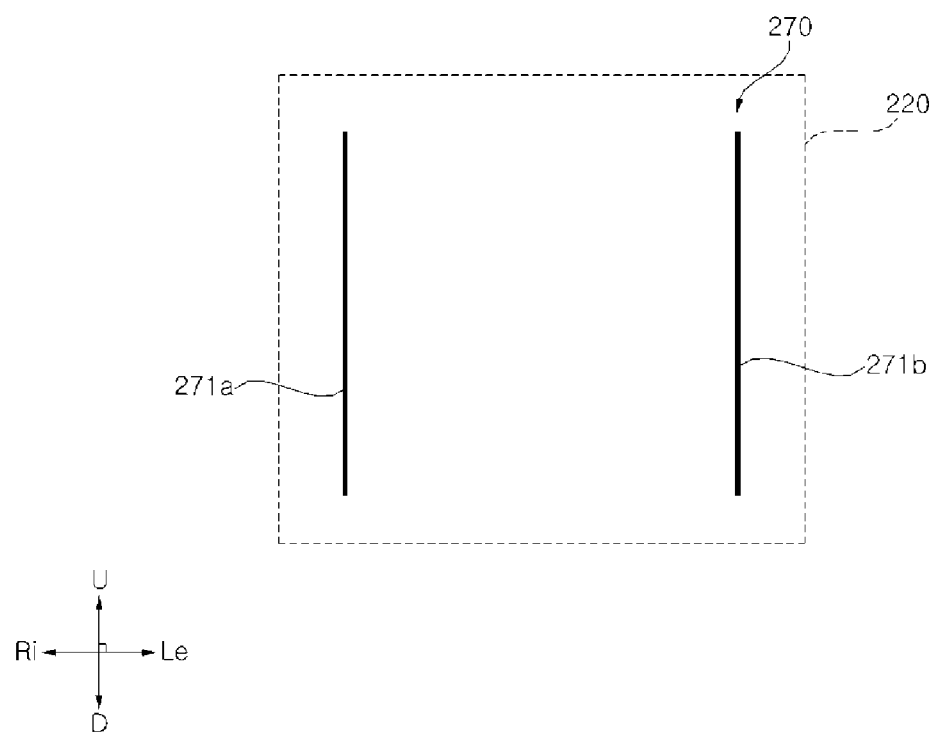
FIG. 7A is a rear view of a reference wire according to an embodiment of the present disclosure.
Figure 7B:
FIG. 7B is a side view of a reference wire according to an embodiment of the present disclosure.
Figure 7B:
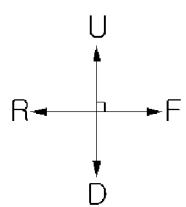

FIG. 7A is a rear view of a reference wire 270 according to a first embodiment of the present disclosure, and FIG. 7B is a side view of the reference wire 270 according to the first embodiment of the present disclosure. Referring to FIGS. 6, 7A, and 7B, the reference wire 270 according to the first embodiment may be positioned inside the docking support 220. The reference wire 270 may generate a magnetic signal in a horizontal direction, and therefore, the reference wire 270 may be positioned to extend in a vertical direction. If the reference wire 270 is positioned at the docking base 230, a thickness of the docking base 230 may increase.

The reference wire 270 may include a vertical portion (or vertical wire segment) 271 that extends in a direction which crosses a horizontal plane. The vertical portion 271 may be positioned substantially parallel to an upward-downward (or vertical) direction (UD). The vertical portion 271 may be formed in a round shape with a curvature while extending in a direction which crosses a horizontal plane. For example, a current input from the vertical portion 271 of the reference wire 270 may travel in an upward direction or in a downward direction.

The vertical portion 271 may be provided as a plurality of vertical portions to generate a magnetic field signal equal to or greater than a reference level from the entire area around the docking unit 200. For example, the vertical portion 271 may include a first vertical portion 271*a* and a second vertical portion 271*b* spaced apart from the first vertical portion 271*a*. In other example, the vertical portion 271 may include just only one of the first vertical portion 271*a* or the second vertical portion 271*b*.

The first vertical portion 271*a* and the second vertical portion 271*b* are spaced apart in a left-right, horizontal direction from each other. The first vertical portion 271*a* may be positioned adjacent to the right end of the docking support 220, and the second vertical portion 271*b* may be positioned adjacent to the left end of the docking support 220. If the first vertical portion 271*a* and the second vertical portion 271*b* are positioned adjacent to both ends of the docking support 220, an area in which a magnetic field generated by the reference wire 270 may expand to maximum size around the docking unit 200.

A direction of travel of a current in the first vertical portion 271*a* may correspond to a direction of travel of a current in the second vertical portion 271*b* or the two directions of travel may be different. In one example, if a current flows from top to bottom in the first vertical portion 271*a*, a current may flow from bottom to top in the second vertical portion 271*b*.

In order to reinforce strength of magnetic fields generated by the first vertical portion 271*a* and the second vertical portion 271*b*, a plurality of first vertical portions 271*a* and a plurality of second vertical portions 271*b* may be provided. Each of the first vertical portion 271*a* and the second vertical portion 271*b* may include a set of multiple wires, and the first vertical portion 271*a* and the second vertical portion 271*b* may have similar configurations. For example, a plurality of first vertical portions 271*a* may be positioned in columns along a line which extends in a front-rear direction, and a plurality of second vertical portions 271*b* may be positioned in columns along a line which extends in the front-rear direction. In another example, each of the first vertical portion 271*a* and the second vertical portion 271*b* may include a single wire, respectively.

If the plurality of first vertical portions 271*a* and the plurality of second vertical portions 271*b* are respectively positioned at the left ends and the right ends of the docking support 220 while being positioned to form columns in the front-rear direction, a charging terminal 211 and a docking connection part 210 may be positioned between the plurality of first vertical portions 271*a* and the plurality of second vertical portions 271*b*. If the charging terminal 211 and the docking connection part 210 are positioned between the plurality of first vertical portions 271*a* and the plurality of second vertical portions 271*b*, it may be possible to arrange the reference wire 270 without changing configurations of the charging terminal 211 and the docking connection part 210.

The plurality of first vertical portions 271a and the plurality of second vertical portions 271b may be electrically connected to each other or may be supplied with electricity from a separate power supply. The docking unit 200 may play a role of transmitting a predetermined current to the reference wire 270. The docking unit 200 may include a wire terminal 250 connected to the reference wire 270. Both ends of the reference wire 270 may be connected to a first wire terminal 250a and a second wire terminal 250b. Through the connection between the reference wire 270 and the wire terminal 250, a power supply of the docking unit 200 may supply a current to the reference wire 270.

For example, both ends of the plurality of first vertical portions 271a may be respectively connected to the first wire terminal 250a and the second wire terminal 250b, and both ends of the plurality of second vertical portions 271b may be respectively connected to the first wire terminal 250a and the second wire terminal 250b. In another example, a reference wire 270 according to another embodiment may further include a horizontal portion (not shown). In this case, the reference wire 270 may be in a structure in which a first vertical portion 271a and a second vertical portion 271b are connected to each other to be supplied with power from a single power supply.

Figure 8:
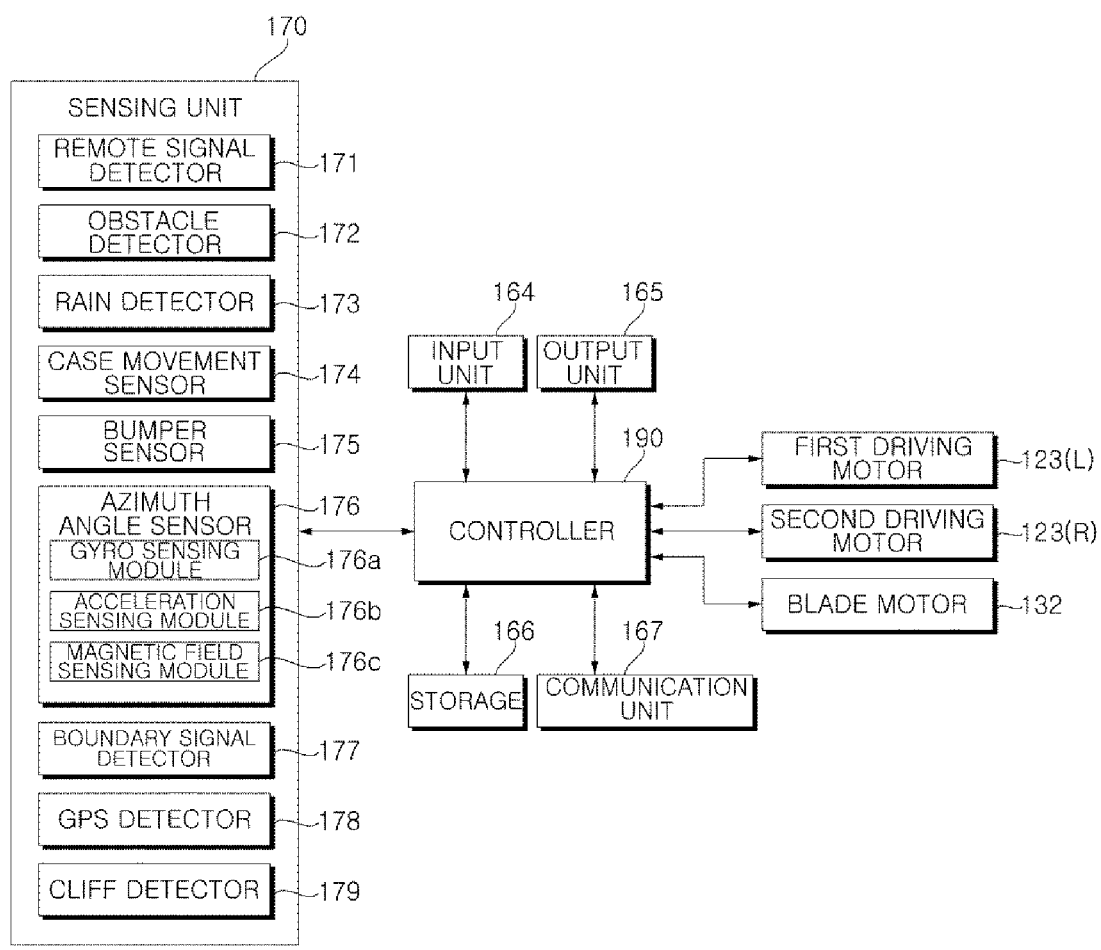
FIG. 8 is a block diagram illustrating example components of the moving robot shown in FIG. 1 according to an embedment of the present disclosure.

FIG. 8 is a block diagram illustrating examples of components that may be included in the moving robot 100 shown in FIG. 1. Referring to FIG. 8, the moving robot 100 may include the input unit (or input interface) 164 through which various instructions from a user may be input. The input unit 164 may include, for example, a button, a dial, a touch-type display, etc. The input unit 164 may include a microphone to recognize a voice. In one embodiment, a plurality of buttons may be positioned in an upper side of the case 112.

The moving robot 100 may include the output unit (or output interface) 165 to output various types of information to a user. The output unit 165 may include a display module, such as a display screen, LEDs, lights, etc., which display visual information. In one embodiment, the display module 165 outputs an image in an upward direction. The display module 165 may be positioned in the upper side of the case 112. In one example, the display module 165 may include a thin film transistor Liquid-Crystal Display (LCD). In addition, the display module 165 may be implemented using various display panels such as a plasma display panel, an organic light emitting diode display panel, etc. Additionally or alternatively, the output unit 165 may include a speaker (not shown) which outputs audible information.

The moving robot 100 may include a storage (or memory) 166 which stores various types of information. The storage 166 stores various types of information necessary to control the moving robot 100, and the storage 166 may include a volatile or non-volatile recording medium. The storage 166 may store information input through the input unit 164 or information received through a communication unit 167. The storage 166 may store a program related to controlling the moving robot 100.

The moving robot 100 may include the communication unit (or communication interface) 167 to communicate with an external device (a terminal, user device, remote control, etc.), a server, a router, etc. For example, the communication unit 167 may be capable of performing wireless communication with a wireless communication technology such as IEEE 802.11 WLAN, IEEE 802.15 WPAN, UWB, Wi-Fi®, Zigbee, Z-wave, Blue-Tooth®, etc. The communication unit 167 may differ depending on a target device to communication or a communication method of a server.

The moving robot 100 may include a sensing unit (or sensor) 170 which senses a state of the moving robot 100 or information relating to an environment external to the moving robot 100. The sensing unit 170 may include at least one of a remote signal detector 171, an obstacle detector 172, a rain detector 173, a case movement sensor 174, a bumper sensor 175, an azimuth angle sensor 176, a boundary signal detector 177, a Global Positioning System (GPS) detector 178, or a cliff detector 179, as described below.

The remote signal detector 171 may receive an external remote signal. Once a remote signal from an external remote controller is transmitted, the remote signal detector 171 may receive the remote signal. For example, the remote signal may be an infrared signal. The signal received by the remote signal detector 171 may be processed by a controller 190. A plurality of remote signal detectors 171 may be provided. The plurality of remote signal detectors 171 may include a first remote signal detector 171a positioned at the front of the body 110, and a second remote signal detector 171b positioned at the rear of the body 110, such that the first remote signal detector 171a may receive a remote signal transmitted from the front and the second remote signal detector 171b receives a remote signal transmitted from the rear.

The obstacle detector 172 may sense an obstacle around the moving robot 100. The obstacle detector 172 may sense an obstacle in the front. A plurality of obstacle detectors 172a, 172b, and 172c may be provided. The obstacle detector 172 may be positioned at a front surface of the body 110. The obstacle detector 172 may be positioned higher than the frame 111. The obstacle detector 172 may include an infrared sensor, an ultrasonic sensor, a Radio Frequency (RF) sensor, a geomagnetic sensor, a Position Sensitive Device (PSD) sensor, etc.

The rain detector 173 may sense rain in an environment where the moving robot 100 is placed. The rain detector 173 may be positioned in the case 112. For example, the rain detector 173 may detect moisture from rain, light condition changes associated with rain, air moisture levels, air pressure, audio associated with rain, etc.

The case movement sensor 174 may sense movement, relative to the body frame 111, of the case connection part (not shown) connecting the case 112 to the frame 111. For example, when the case 112 is lifted upward from the frame 111, the case connection part may move upward, and accordingly, the case movement sensor 174 senses the lifted state of the case 112. In another example, if a user lifts the case 112 or the moving robot 100 contacts a considerable-sized obstacle underneath such that the case 112 is lifted, the case movement sensor 174 may sense the lift. If the case movement sensor 174 senses the lifted state of the case 112, the controller 190 may perform a control action, such as stopping or slowing an operation of the blade 131 or covering the blade 131 to improve safety.

The bumper sensor 175 may sense rotation of the movable fixing part (not shown) connecting a bumper 112 to the frame 111 or case 112. For example, a magnet may be positioned in one side of the bottom of the movable fixing part, and a sensor for sensing a change in a magnetic field of the magnet may be positioned in the frame. When the movable fixing part rotates, the bumper sensor 175 senses a change in the magnetic field of the magnet. Thus, the bumper sensor 175 capable of sensing rotation of the movable fixing part may be implemented. When the bumper 112b collides with an external obstacle, the movable fixing part may rotate integrally with the bumper 112b. As the bumper sensor 175 senses the rotation of the movable fixing part, the bumper sensor 175 may sense the collision of the bumper 112b.

The sensing unit 170 may include a tilt information acquisition unit 180 which acquires tilt information related to a tilt of a traveling surface (S), such as the ground. By sensing a tilt of the body 110, the tilt information acquisition unit 180 may acquire the tilt information on inclination of the traveling surface (S) on which the body 110 may be placed. In one example, the tilt information acquisition unit 180 may include a gyro sensing module 176a. The tilt information acquisition unit 180 may include a processing module (not shown) which converts a sensing signal from the gyro sensing module 176a into the tilt information. The processing module may be implemented as an algorithm or a program implemented by or encoded into the controller 190. In another example, the tilt information acquisition unit 180 may include a magnetic field sensing module 176c, and may acquire the tilt information based on sensing information about the magnetic field of the Earth.

The azimuth angle sensor (AHRS) 176 may have a gyro sensing function. The azimuth angle sensor 176 may further include an acceleration sensing function. The azimuth angle sensor 176 may further include a magnetic field sensing function. The azimuth angle sensor 176 may include a gyro sensing module 176a which performs gyro sensing. The gyro sensing module 176a may sense a horizontal rotational speed of the body 110. The gyro sensing module 176a may sense a tilting speed of the body 110 relative to a horizontal plane.

The gyro sensing module 176a may acquire information on a rotational angular speed relative of the body 110 to the horizontal plane. For example, the gyro sensing module 176a may sense a rotational angular speed which is parallel to the horizontal plane about the X and Y axes orthogonal to each other. By merging a rotational angular speed (roll) about the X axis and a rotational angular speed (pitch) about the Y axis with the processing module, tilt information acquisition unit 180 may calculate a rotational angular speed relative to the horizontal plane. By integrating the rotational angular speed relative to the horizontal plane, tilt information acquisition unit 180 may calculate a tilt value. The gyro sensing module 176a may sense a predetermined reference direction, and the tilt information acquisition unit 180 may acquire the tilt information based on the reference direction.

The gyro sensing module 176a may include a gyro sensing function regarding three axes orthogonal to each other in a spatial coordinate system. Information collected by the gyro sensing module 176a may be roll, pitch, and yaw information. The processing module may calculate a direction angle of a cleaner 1 or 1' by integrating the roll, pitch, and yaw angular speeds.

The azimuth angle sensor 176 may include an acceleration sensing module 176b which senses acceleration. The acceleration sensing module 176b has an acceleration sensing function regarding three axes orthogonal to each other in a spatial coordinate system. A predetermined processing module calculates a speed by integrating the acceleration, and may calculate a movement distance by integrating the speed.

The azimuth angle sensor 176 may include a magnetic field sensing module 176c which performs magnetic field sensing. The magnetic sensing module 176c may have a magnetic field sensing function regarding three axes orthogonal to each other in a spatial coordinate system. The magnetic field sensing module 176c may sense the magnetic field of the Earth.

The boundary signal detector 177 may detect a boundary signal from the boundary wire 290 and/or a docking position signal from the reference wire 270. In addition, the boundary signal detector 177 may detect a proximity boundary signal generated in a proximity boundary area 295 in which a portion of a first travel area A1 and a portion of a second travel area A2 are proximal to each other.

The boundary signal detector 177 may be positioned at the front of the body 110. In doing so, when the moving robot 100 moves in a forward direction (e.g., the primary travel direction for the moving robot 100), the boundary signal detector 177 may sense the boundary of the travel area in advance, such that the boundary is detected before the moving robot 100 crosses the boundary. The boundary signal detector 177 may be positioned in an inner space of the bumper 112b.

The boundary signal detector 177 may include a first boundary signal detector 177a and a second boundary signal detector 177b which are positioned, respectively, leftward and rightward from each other. The first boundary signal detector 177a and the second boundary signal detector 177b may be positioned at the front of the body 110.

For example, the boundary signal detector 177 may include a magnetic field sensor. The boundary signal detector 177 may be implemented using a coil to detect a change in a magnetic field. The boundary signal detector 177 may sense at least a horizontal magnetic field.

In one example, the boundary signal detector 177 may sense a magnetic field on three axes which are spatially orthogonal to each other. For example, the first boundary signal detector 177a may detect a magnetic signal of a direction that may be orthogonal to the second boundary signal detector 177b. The first boundary signal detector 177a and the second boundary signal detector 177b may detect magnetic field signals of directions orthogonal to each other, and detect a magnetic field on three axes spatially orthogonal to each other by combining values of the detected magnetic field signals.

When detecting the magnetic field on the three axes spatially orthogonal to each other, the boundary signal detector 177 may determine a direction of the magnetic field using a resultant vector of three axes. In this implementation, the boundary signal detector 177 may recognize a docking position signal if the direction of the magnetic field is close to a horizontal direction, while recognizing a boundary signal if the direction of the magnetic field is close to a vertical direction.

In addition, the boundary signal detector 177 may distinguish the proximity boundary signal and boundary signals of the first travel area A1 and the second travel area A2 based on a difference in strength of magnetic fields, and distinguish the proximity boundary signal and the docking position signal based on a difference in direction of magnetic fields. For example, if currents are applied in the same direction when a first boundary wire 291 of the first travel area A1 and a second boundary wire 292 of the second travel area A2 partially or entirely overlap each other, a magnetic field with a strength much greater than respective strengths of separate magnetic fields generated in each of the first boundary wire 291 and the second boundary wire 292 may be generated, and accordingly, the boundary signal detector 177 may distinguish each signal based on a level of magnetic field strengths.

In another example, the boundary signal detector 177 may distinguish the proximity boundary signal and the boundary signals of the first travel area A1 and the second travel area A2 based on a difference in distribution of magnetic fields. Specifically, if currents are applied in the same direction or in different directions when the first boundary wire 291 of the first travel area A1 and the second boundary wire 292 of the second travel area A2 are positioned within a certain range, the boundary signal detector 177 may recognize a proximity boundary signal by detecting multiple peaks of a magnetic field strength within a predetermined range in the horizontal coordinate system.

The GPS detector 178 may be provided to detect a GPS signal. The GPS detector 178 may be implemented using a Printed Circuit Board (PCB). The cliff detector 179 detects presence of a cliff in a travel surface. The cliff detector 179 may be positioned at the front of the body 110 to detect presence of a cliff in the front of the moving robot 100. The sensing unit 170 may include an opening/closing detector (not shown) which detects opening/closing of at least one of the first opening and closing door 117 or the second opening and closing door 118. The opening/closing detector may be positioned at the case 112.

The moving robot 100 may include the controller 190 which controls autonomous traveling of the moving robot 100 or other functions such as the rotation of the blade 131. The controller 190 may process a signal from the sensing unit 170. The controller 190 may process a signal from the input unit 164. The controller 190 may control the first driving motor 123(L) and the second driving motor 123(R). For example, the controller 190 may adjust a power and/or current applied to the driving motors 123(L) and 123(R) to change a rotational speed, rotational direction, or a rotation force of the driving wheels 121 or to stop the driving wheels 121. The controller 190 may further control driving of the blade motor 132. For example, the controller 190 may adjust a power and/or current applied to the blade motor 132 to change a rotational speed, rotational direction, or a rotation force of the blade 131 or to stop a rotation of the blade 131. The controller 190 may further control outputting of the output unit 165, such as to output status data.

The controller 190 may include a processor or a main board (not shown) which may include various circuitry associated with a processor and may be positioned in the inner space of the body 110. The main board may correspond to a printed circuit board (PCB) including a processor, other circuitry, or connecting wires.

The controller 190 may control autonomous traveling of the moving robot 100. The controller 190 may control driving of the traveling unit 120 based on a signal received from the input unit 164. The controller 190 may control driving of the traveling unit 120 based on a signal received from the sensing unit 170. In addition, the controller 190 may process a signal from the boundary signal detector 177. Specifically, when the boundary signal detector 177 detects a docking position signal, the controller 190 may set a position at which the docking position signal is detected as a reference point. If a return command for return back to the reference point determined by the docking position signal is received, the controller 190 may control the moving robot to travel to the reference point.

In addition, when the boundary signal detector 177 detects a boundary signal, the controller 190 may set a position at which the boundary signal is detected as a boundary of a travel area. The controller 190 may control the moving robot 100 to travel within the boundary of the travel area. In addition, when the boundary signal detector 177 detects a proximity boundary signal, the controller 190 may set a position at which the proximity boundary signal is detected as the proximity boundary area 295. The controller 190 may control the moving robot 100 to return along the proximity boundary area 295. In addition, the controller 190 may define the proximity boundary line 296 based on the proximity boundary signal and control the travelling unit to perform a homing travel. The homing travel and the proximity boundary line 296 will be described later.

Figure 9:
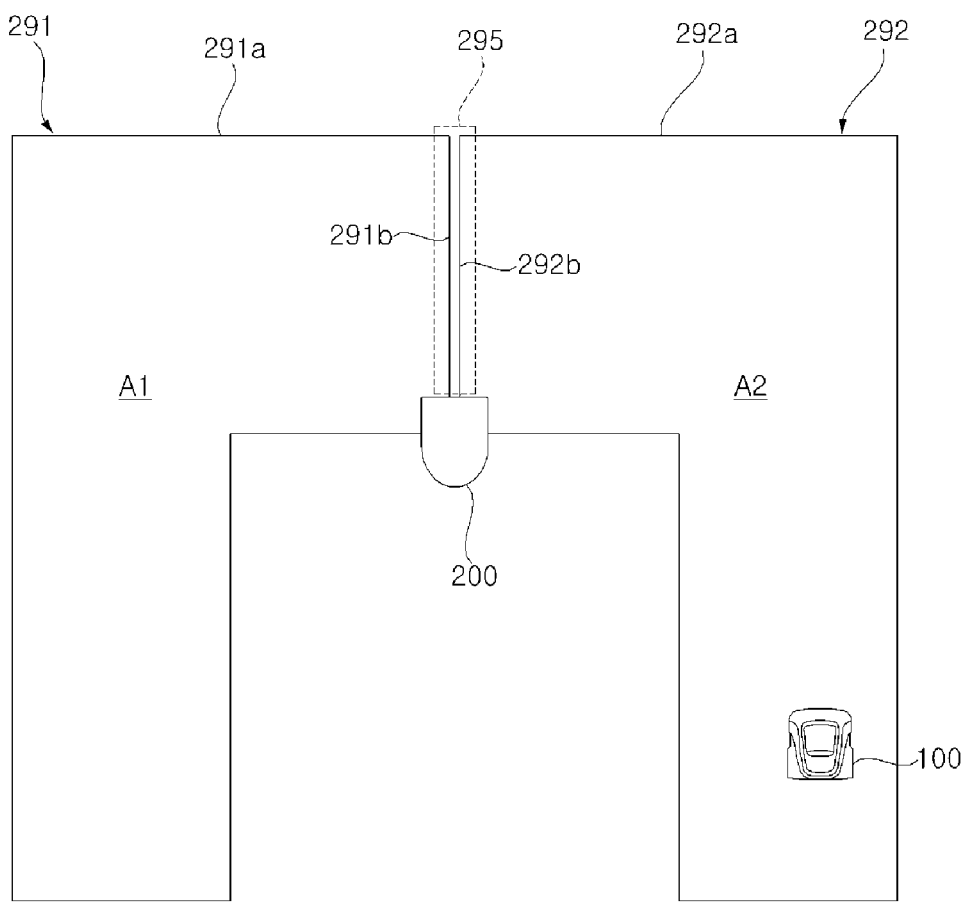
FIG. 9 is a diagram illustrating a moving robot system according to an embodiment of the present disclosure.

FIG. 9 is a diagram illustrating a system of the moving robot 100 and boundary wire 290, according to an embodiment of the present disclosure. Referring to FIG. 9, the moving robot system in one embodiment may include the first boundary wire 291 and the second boundary wire 292 which define the first travel area A1 and the second travel area A2, respectively; and the moving robot 100 which travels in a travel area. In addition, the system of the moving robot 100 of the present disclosure may further include a docking unit 200 with which the moving robot 100 may be docked to be charged.

Two boundary wires 291 and 292, each defining a boundary of a travel area, may be positioned so the entire travel area may be divided into the first travel area A1 and the second travel area A2. The first travel area A1 and the second travel area A2 define a closed area in a horizontal plane with the docking unit 200.

The proximity boundary area 295 may be defined as an area in which part of the first boundary wire 291 and part of the second boundary wire 292 are located within a predetermined range, or as an area which has expanded by a predetermined size outwardly from the area in which part of the first boundary wire 291 and part of the second boundary wire 292 are located within a predetermined range. Part of the first boundary wire 291, which is proximal to the second boundary wire 292 within the predetermined range, may be defined as a first proximal portion 291b, and the rest part of the first boundary wire 291 excluding the first proximal portion 291b may be defined a first distal portion 291a. In addition, part of the second boundary wire 292, which is proximal to the first boundary wire 291 within the predetermined range, may be defined as a second proximal portion 292b, and the rest part of the second boundary wire 292 excluding the second proximal portion 292b may be defined as a second distal portion 292a.

The first distal portion 291a of the first boundary wire 291 and the second space portion 292a of the second boundary wire 292 may define an entire travel area (e.g., such that the moving robot does not leave areas A1 and A2 bonded by, respectively, the first boundary wire 291 and the second boundary wire 292). In this embodiment, the first travel area A1 and the second travel area A2 generally do not overlap each other. There is no limitation on a distance between the first proximal portion 291b and the second proximal portion 292b, but may be between zero to 2 m in one implementation. In another implementation, the first distal portion 291a and the second distal portion 292a may be omitted such that the movement of the moving robot is not bounded by the first and second boundary wires 291, 292 (e.g., such that the first and second boundary wires 291, 292 are only provided in the proximity boundary area 295 to guide a homing travel of the moving robot 100). In one example, the first boundary wire 291 and the second boundary wire 292 may be positioned to overlap at least partially in the proximity boundary area 295. For example, the first proximal portion 291b and the second proximal portion 292b may partially or entirely overlap.

The first boundary wire 291 and the second boundary wire 292 may be positioned parallel to each other in the proximity boundary area 295. For example, the first proximal portion 291b and the second proximal portion 292b may be positioned in a straight-line form to be parallel to each other, and a distance between the first proximal portion 291b and the second proximal portion 292b may be predetermined.

One end of the proximity boundary area 295 may be positioned proximal to the docking unit 200. Specifically, the proximity boundary area 295 may be positioned on an arbitrary line which connects the docking unit 200 to a point on a boundary facing the docking unit 200 and spaced apart the shorted distance from the docking unit 200 in an entire travel area.

In one example, one end of the first proximal portion 291b may be connected to the docking unit 200, the other end of the first proximity portion 291b may be connected to one end of the first distal portion 291a, and the other end of the first distal portion 291a may be connected to the docking unit 200. Similarly, one end of the second proximity portion 292b may be connected to the docking unit 200, the other end of the second proximal portion 292b may be connected to one end of the second distal portion 292a, and the other end of the second distal portion 292a may be connected to the docking unit 220.

When the moving robot 100 travels to perform a task, the controller 190 may control the travelling unit (e.g., driving wheels 121) to move the moving robot 100 between the first travel area A1 and the second travel area A2, regardless of the proximity boundary area 295.

Figure 10:
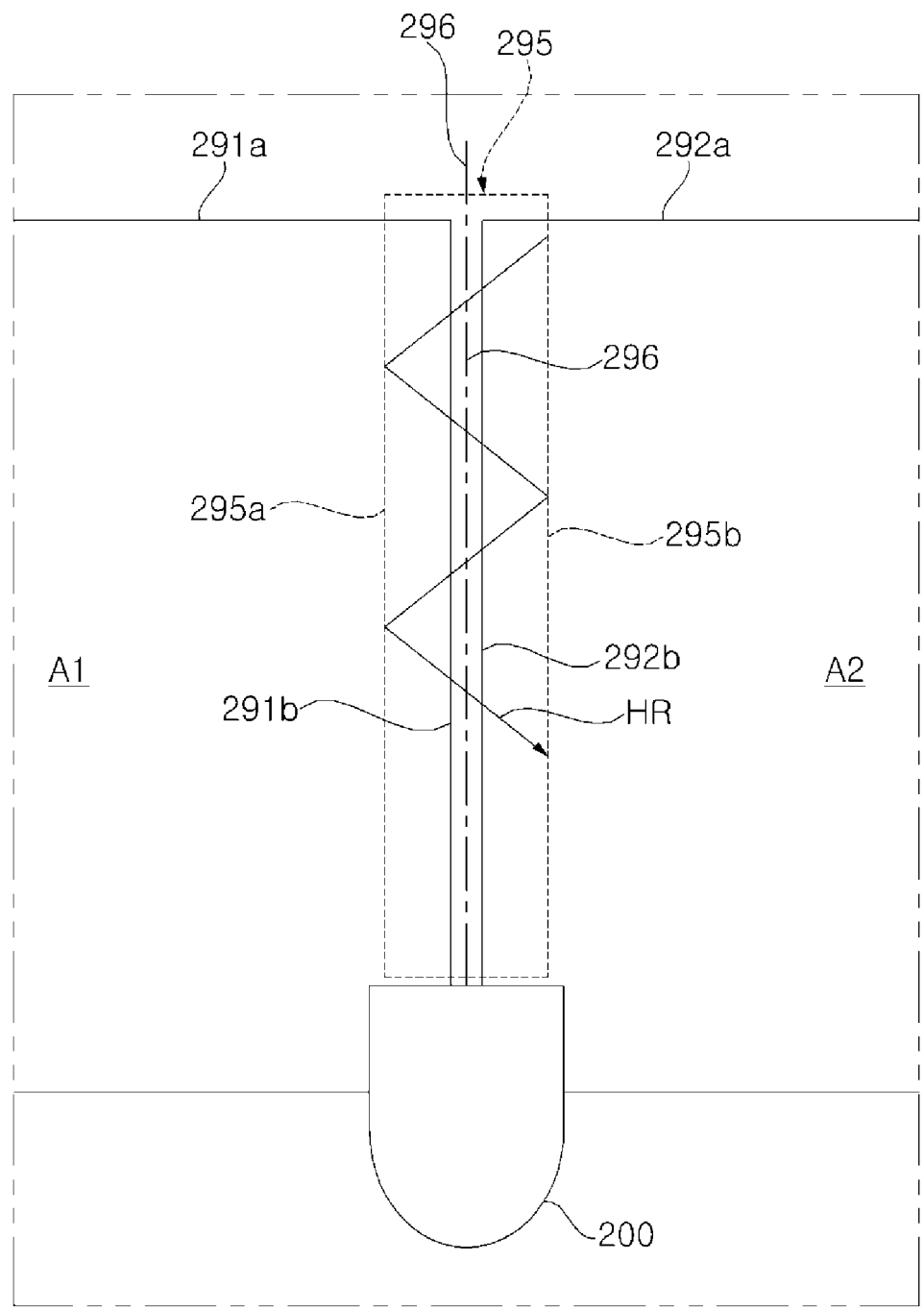
FIG. 10 is a zoomed-in view of a region of the moving robot system shown in FIG. 9.

Hereinafter, a homing movement of the moving robot 100 (e.g., toward the docking unit 200) through in the proximity boundary area 295 will be described. FIG. 10 is a zoomed-in view of part of the system of the moving robot 100 shown in FIG. 9, and FIG. 11 is a diagram illustrating a homing travel route (HR) of the moving robot 100 according to an embodiment of the present disclosure.

Figure 11:
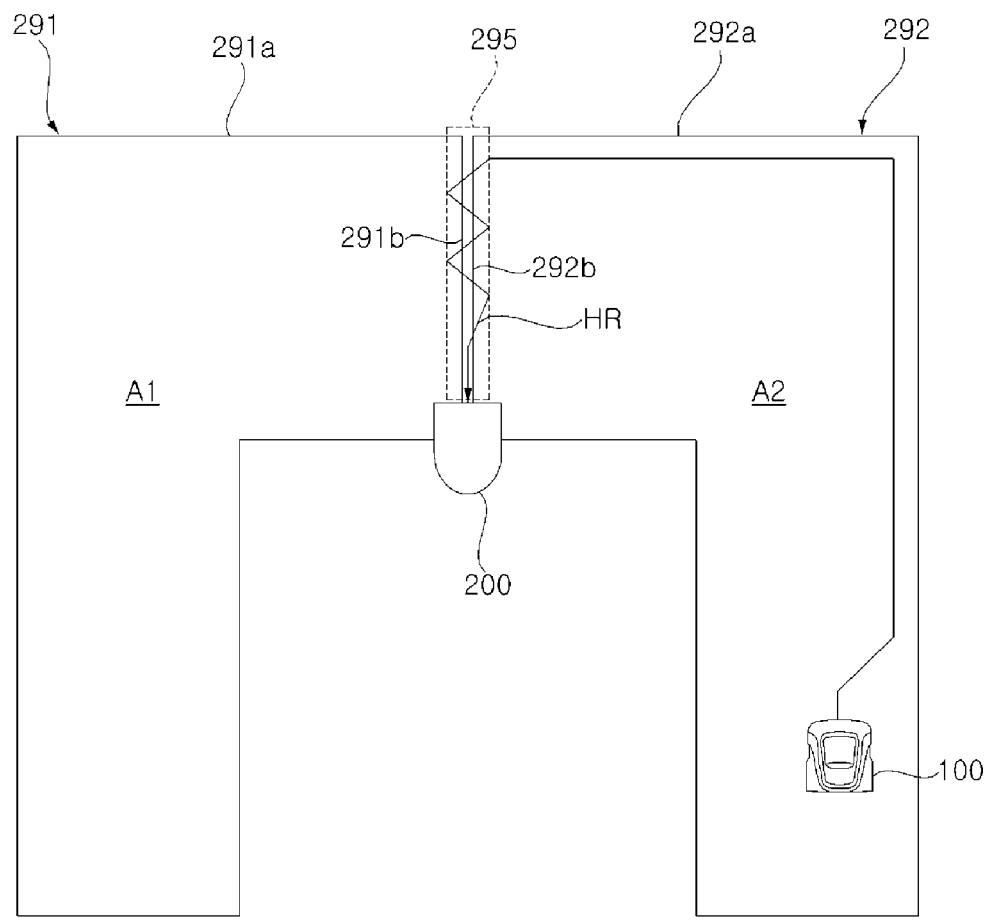
FIG. 11 is a diagram illustrating an example of a homing travel route of a moving robot in the moving robot system shown in FIG. 9.

Referring to FIGS. 10 and 11, the controller 190 may define the proximity boundary line 296 based on a proximity boundary signal and may control the travelling unit to perform a homing travel so that the body travels along a proximity boundary line 296. The controller 190 may define the proximity boundary line 296, which may be a reference line for travelling of the moving robot 100, based on distribution of a magnetic field which may be a proximity boundary signal received from the boundary signal detector 177. In addition, a travel of the moving robot 100 in accordance with a proximity boundary signal corresponds to the moving robot 100 traveling substantially along the proximity boundary line 296.

For example, if currents are applied in the same direction when the first boundary wire 291 of the first travel area A1 and the second boundary wire 292 of the second travel area A2 overlap at least partially or entirely, a magnetic field with strength greater than strength of a magnetic field generated in each of the first boundary wire 291 and the second boundary wire 292 may be generated. Therefore, controller 190 may distinguish each signal based on a difference in strength of magnetic fields. In this case, the proximity boundary line 296 may be defined as a virtual line that connects peaks of a magnetic field with strength greater than a predetermined magnetic field strength. In this example, in which the first boundary wire 291 and the second boundary wire 292 overlap each other, the first boundary wire 291 may be set as the proximity boundary line 296.

In another example, when the first boundary wire 291 of the first travel area A1 and the second boundary wire 292 of the second travel area A2 are positioned within a predetermined range without overlapping each other, there are two or more peaks in distribution of magnetic fields generated by the first boundary wire 291 and the second boundary wire 292. Thus, controller 190 may be possible to distinguish a boundary signal and a proximity boundary signal based on the number of peaks in distribution of the magnetic fields. In this example, the proximity boundary line 296 may be defined as a virtual line that connects center points between multiple peaks in distribution of magnetic fields. For instance, the proximity boundary line may be set as a line that connect center points of the first distal portion 291a and the second distal portion 292a.

As used herein, "homing travel" may correspond to a movement of the moving robot 100 to return back to the docking unit 200. The controller 190 may perform the homing travel upon receiving a homing signal (e.g., via the input unit 164). In another example, when a remaining battery power of the moving robot is equal to or lower than a predetermined level, the controller 190 may perform the homing travel.

The moving robot may repeated perform homing travel, such as to charge itself when mowing the grass, and when the moving robot 100 repeatedly travels along the proximity boundary line 296 during the homing travel in the proximity boundary area 295, pits may be made on the ground due to the repeated travel. To prevent damage to ground based on the traveling on the proximity boundary line 296, the moving robot 100 in one implementation, may travel adjacent to the proximity boundary line 296 in the proximity boundary area 295. For example, the moving robot 100 may perform homing travel in a random travel route while travelling based on the proximity boundary line 296.

For example, the controller 190 may control the travelling unit such that, during the homing travel, the body converts a direction of travel a random number of times in a homing travel area which may be set about the proximity boundary line 296. In this case, the homing travel area may be defined as a closed area that may be centered about the proximity boundary line 296, such that the homing travel area includes a region within a threshold distance of the proximity boundary line 296. More specifically, the homing travel area may be defined as an area between a first homing boundary line 295a and a second homing boundary line 295b which are parallel to the proximity boundary line 296 positioned therebetween.

As converting a direction a random number of times in the homing travel area, the moving robot moves along the proximity boundary line 296 in a direction distal from the first distal portion 291a and the second distal portion 292a, and thus, the ground may be less likely to be damaged during the homing travel. If the moving robot 100 converts a direction in the homing travel area a random number of times, part of the homing travel route of the moving robot 100 may become too long. Thus, during the homing travel, the moving robot 100 may travel in zig-zag fashion within the proximity boundary area 295.

For example, the controller 190 may control the traveling unit such that, during the homing travel, the body travels along a homing travel route HR which crosses the proximity boundary line 296 a random quantity of times (e.g., a quantity between 1 and maximum threshold, as determined by a random number generator). In addition, the controller 190 may control the travelling unit such that, during the homing travel, the body converts a direction of travel at the first and second homing boundary lines 295a, 295b to travel in a direction which crosses the proximity boundary line 296. In one example, whenever traveling for homing, the controller 290 may randomly set the number of times to convert a direction of travel on the first and second homing boundary lines 295a, 295b. In addition, the controller 190 may control the travelling unit such that, during the homing travel, the body may cross the first and second homing boundary lines 295a, 295b to enter the first travel area A1 and the second travel area A2, alternatively.

When a proximity boundary signal is not detected at a time of receiving a homing signal, the controller 190 may control the travelling unit so that the body travels in accordance with a boundary signal of the first travel area A1 or a boundary signal of the second travel area A2, and, if a docking position signal is detected during the homing travel, the controller 190 may control the travelling unit so that the body performs docking travel. For example, when the proximity boundary signal is not detected, the moving robot 100 may first detect a boundary signal within a variable distance to travel along the first distal portion 291a of the first boundary wire 291 or the second distal portion 292a of the second boundary wire 292 such that the moving robot 100 does not leave the bounded areas A1 and A2. If the moving robot 100 detects a proximity boundary signal (e.g., a composite signal generated by the first boundary wire 291 and the second boundary wire 292) while travelling along the first distal portion 291a of the first boundary wire 291 or the second distal portion 292a of the second boundary wire 292, the moving robot may travel in accordance with the proximity boundary signal, and, if a docking position signal is detected, the moving robot 100 may control the travelling unit so that the body performs docking travel. The docking travel is a travel for docking of the moving robot 100 to the docking unit.

Figure 12:
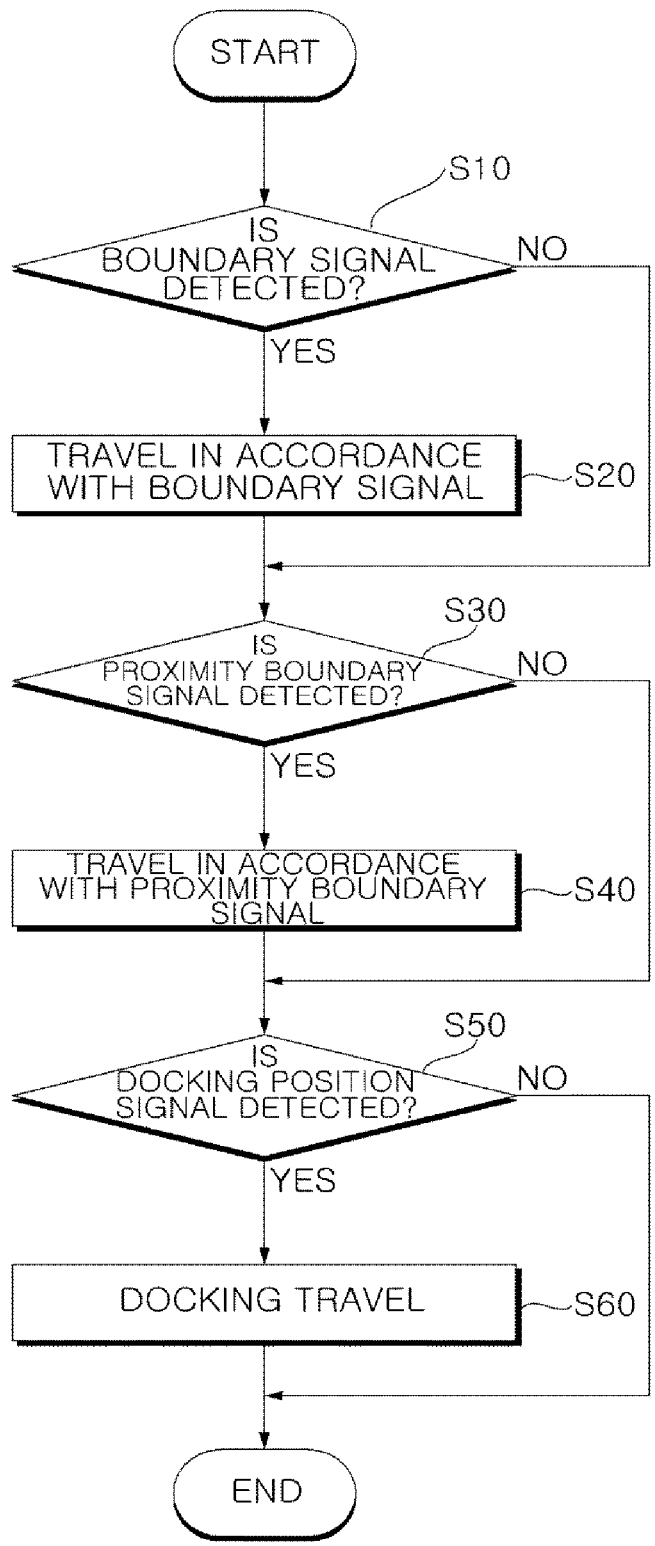
FIG. 12 is a flowchart diagram illustrating a control method of a moving robot according to an embodiment of the present disclosure.

FIG. 12 is a flowchart illustrating a method of controlling a traveling of the moving robot 100 according to an embodiment of the present disclosure. Referring to FIG. 12, the control method of the moving robot 100 according to an embodiment of the present disclosure starts off by detecting a boundary signal (e.g., a signal generated by one of the first boundary wire 291 or the second boundary wire 292). When detecting a user's homing command or a lack of remaining battery power of the moving robot 100, the moving robot 100 may start a homing travel mode. In the homing travel mode, the boundary signal detector 177 may move within the areas A1 and/or A2 to detect a boundary signal (S10). When the boundary signal is detected, the moving robot 100 may travel in accordance with the boundary signal (S20). For example, the moving robot 100 may turn to remain within the areas A1 and/or A2. When the boundary signal is not detected, the moving robot may detect a proximity boundary signal or a docking position signal.

Next, the boundary signal detector 177 may detect a proximity boundary signal (S30) (e.g., a composite signal generated by the first boundary wire 291 and the second boundary wire 292). When the proximity boundary signal is detected, the moving robot 100 travels in accordance with the proximity boundary signal (S40). As described above, the moving robot 100 may travel along a random route when traveling in accordance with the proximity boundary signal. For example, the moving robot 100 may move to cross adjacent portions of the first boundary wire 291 and the second boundary wire 292. Next, the boundary signal detector 177 may detect a docking position signal. When the docking position signal is detected, the moving robot 100 may perform docking travel (S20). In some embodiments, the order of detecting a boundary signal, a proximity boundary signal, and a docking position signal may be changed. If docked to the docking unit 200, the moving robot 100 may terminate the homing travel mode, regardless of the above order.

Figure 13:
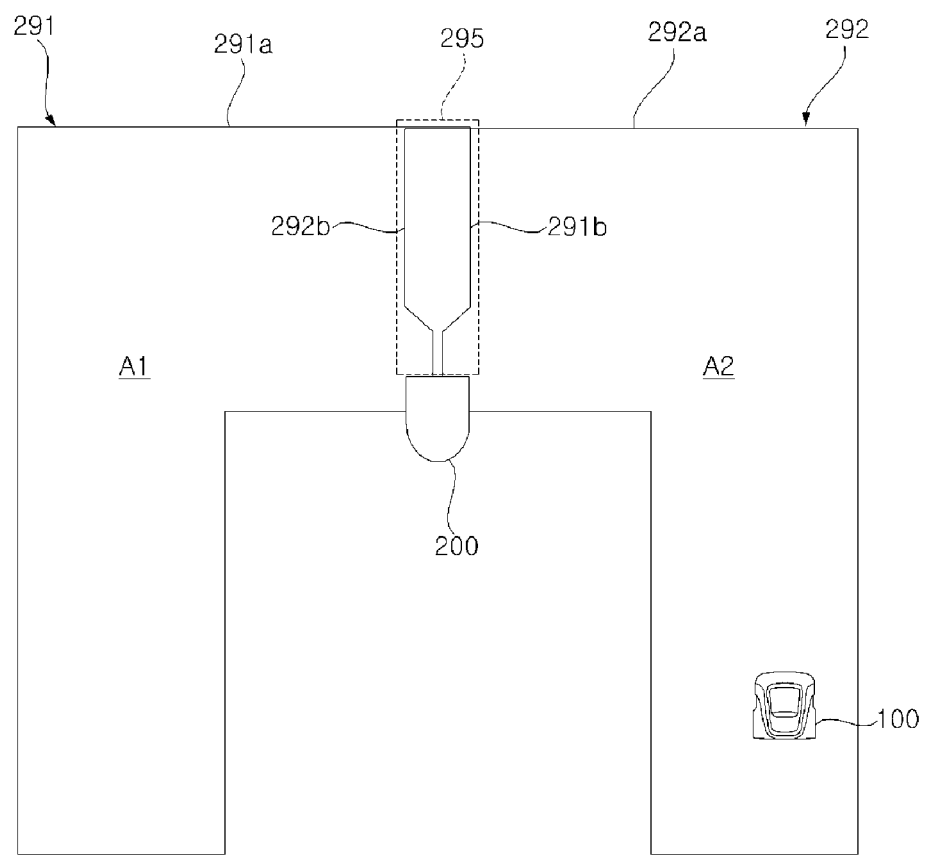
FIG. 13 is a diagram illustrating a moving robot system according to another embodiment of the present disclosure.
Figure 14:
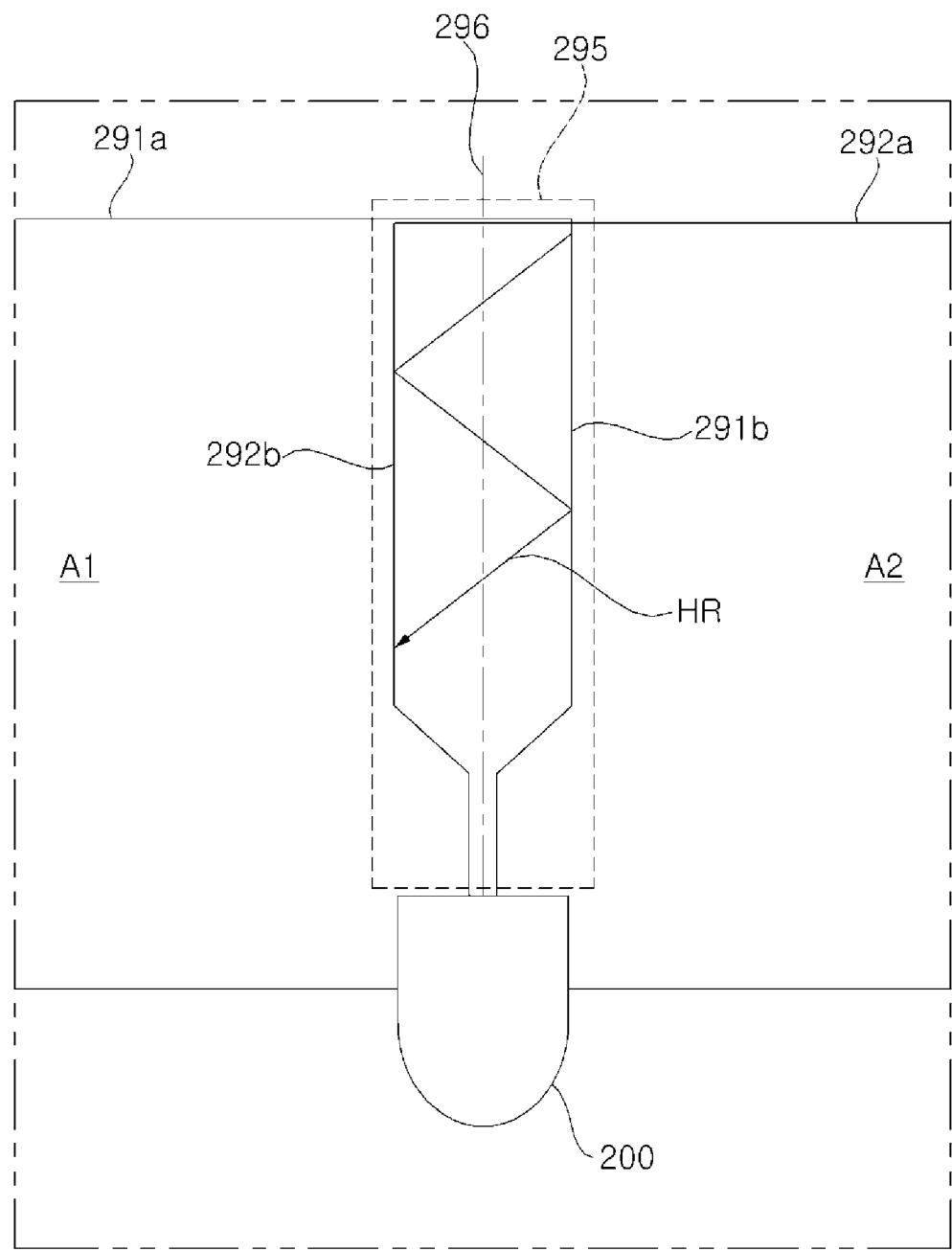
FIG. 14 is a diagram illustrating a zoomed-in view of a region of the moving robot system shown in FIG. 13 and an example of a homing travel route in the moving robot system shown in FIG. 13.

FIG. 13 is a diagram illustrating a system of a moving robot 100 according to another embodiment of the present disclosure, and FIG. 14 is a diagram illustrating a zoomed-in version of part of the system of the moving robot 100 shown in FIG. 13 and a homing travel route HR. Referring to FIGS. 13 and 14, the first boundary wire 291 and the second boundary wire 292 crosses each other in the proximity boundary area 295, as opposed in the embodiment of FIG. 9 in which the first boundary wire 291 and the second boundary wire 292 are positioned adjacent to each other but do not cross or intersect. In contrast the configuration shown in FIG. 9, the first proximal portion 291b of the first boundary wire 291 and the second proximal portion 292b of the second boundary wire 292 cross each other, and thus, part of the first travel area A1 and part of the second travel area A2 may overlap.

In this configuration shown in FIG. 13, instead of crossing a proximity boundary line associated with adjacent sections 291b and 292b of the first boundary wire 291 and the second boundary wire 292 during homing travel as shown in FIG. 11, the moving robot may travel within a region defined within the first proximal portion 291b of the first boundary wire 291 and the second proximal portion 292b of the second boundary wire 292. For example, the moving robot 100 may move to cross the first proximal portion 291b of the first boundary wire 291 and the second proximal portion 292b of the second boundary wire 292 one time to enter the region bounded by the first proximal portion 291b and the second proximal portion 292b of the second boundary wire 292, and then may turn one or more times to avoid leaving this region. The moving robot 100 may turn a random number of times in the region and/or until a homing signal is detected. The moving robot may then travel through the region toward the docking device 200.

According to aspects of the present disclosure, a moving robot is capable of recognizing easily and accurately recognizing a position of a charging station, that a driving time of the moving robot increases because a route for the moving robot to return back to the charging station is not uniformly formed along a boundary, and that it is possible to prevent pits from being formed on the ground due to repeated movement of the moving robot.

In addition, recognizing the position of the charging station, recognizing a boundary of a travel area, and recognizing a proximity boundary area are possible with only one sensor using a magnetic field signal. The position of the charging station and the boundary may be identified based on a difference in direction, distribution, or strength between magnetic fields. As the moving robot is capable of recognizing a homing travel route, it is possible to reduce manufacturing costs and reduce a control burden on a controller.

In addition, aspects of the present disclosure include an addition of a simple component, such as positioning a conductive wire inside a docking unit, and therefore, it is possible to reduce manufacturing costs, to share a boundary wire which constitutes a boundary, and to be driven together with the order wire using one power supply. In addition, because the conductive wire is positioned inside a docking support which vertically extends, it is not necessary to change configuration of the docking unit in order to position the conductive wire.

An aspect of the present disclosure provides a moving robot, which reduces a travel route, and a moving robot system. Another aspect of the present disclosure is to provide a moving robot, which makes less pits on the ground when returning back to a charging station by following the same route along a boundary, and a moving robot system. Yet another aspect of the present disclosure is to provide a moving robot which is capable of easily and accurately recognizing a position of a charging station. Yet another aspect of the present disclosure is to provide a moving robot which shares a sensor for recognizing a travel route, without an additional sensor being attached.

To achieve the above-identified aspects, a moving robot and a moving robot system according to the present disclosure are characterized in that the moving robot travels in accordance with a proximity boundary signal generated in a proximity boundary area in which a portion of a first travel area and a portion of a second travel area are proximal to each other. In addition, the moving robot may travel along a random travel route while travelling in accordance with a proximity boundary signal. In addition, moving robot may recognize at least horizontal magnetic field.

For example, the moving robot may include: a body defining an exterior; a travelling unit configured to move the body; a boundary signal detector configured to detect a proximity boundary signal generated in a proximity boundary area in which a portion of a first travel area and a portion of a second travel area are proximal to each other; and a controller configured to define a proximity boundary line based on the proximity boundary signal, and control the travelling unit such that the body performs a homing travel which indicates travelling along the proximity boundary line.

The controller may be further configured to perform the homing travel upon receiving a homing signal. The controller may be further configured to control the travelling unit such that, during the homing travel, the body converts a direction of travel a random number of times within a homing travel area which is set about the proximity boundary line. The controller may be further configured to control the travelling unit such that, during the homing travel, the body travels along a homing travel route which crosses the proximity boundary line a random number of times.

The controller may be further configured to: define a first homing boundary line and a second homing boundary line which are parallel to the proximity boundary line positioned therebetween; and control the travelling unit such that, during the homing travel, the body converts a direction of travel on the first and second homing boundary lines and travels in a direction of travel which crosses the proximity boundary line. The controller may be further configured to control the travelling unit such that, during the homing travel, the body enters the first travel area and the second travel area, alternatively.

The boundary signal detector may comprise a magnetic field sensor. The boundary signal detector may be further configured to distinguish the proximity boundary signal and boundary signals of the first travel area and the second travel area based on a difference in strength of magnetic fields. The boundary signal detector may be further configured to distinguish the proximity boundary signal and boundary signals of the first travel area and the second travel area based on differences in distribution of magnetic fields.

The controller may be further configured to, when the proximity boundary signal is not detected at a time of receiving the homing signal, control the travelling unit such that the body travels in accordance of a boundary signal of the first travel area and a boundary signal of the second travel area.

The boundary signal detector may be further configured to detect a docking position signal generated in a docking unit, and the controller may be further configured to, when the docking position signal is detected during the homing travel, control the travelling unit such that the body performs a docking travel. The boundary signal detector may be further configured to distinguish the docking position signal and the proximity boundary signal based on a difference in direction of magnetic fields.

In another aspect, a system may include a first boundary wire and a second boundary wire respectively defining a first travel area and a second travel area; and a moving robot which comprises a body defining an exterior, a travelling unit configured to move the body, a boundary signal detector configured to detect a proximity boundary signal generated in a proximity boundary area in which a portion of the first travel area and a portion of the second travel area are proximal to each other, and a controller configured to define a proximity boundary line based on the proximity boundary signal and control the travelling unit such that the body performs a homing travel which indicates travelling along the proximity boundary line.

The first boundary wire and the second boundary wire may cross each other within the proximity boundary area. The first boundary wire and the second boundary wire may be positioned parallel to each other within the proximity boundary area. The first boundary wire and the second boundary wire at least partially overlap each other within the proximity boundary area.

The moving robot system may further include a docking unit to which the moving robot is docked for recharging, wherein one end of the proximity boundary area is positioned proximal to the docking unit. The docking unit may further include a first wire terminal wire and a second wire terminal which are connected to a power supply, one end of the first boundary wire and one end of the second boundary wire may be connected to the first wire terminal, and the other end of the first boundary wire and the other end of the second boundary wire may be connected to the second wire terminal.

The controller may be further configured to control the travelling unit such that, during the moving travel, the body travels along a homing travel route which crosses the proximity boundary line a random number of times. The docking unit may further include a reference wire which extends in an upward-downward direction crossing the boundary wires, and which generates a docking position signal.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" may include any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention. For example, it should be appreciated that the terms "first", "second" etc. are used to distinguish elements, and not related to a sequence, importance levels, or a master-servant relationship of elements. For example, only a second element may be included without a first element.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative the other elements or features. Thus, the exemplary term "lower" can encompass both an orientation of above and below. The device may be otherwise oriented (rotated 90 degrees or at other orientations) and the spatially relative descriptors used herein interpreted accordingly. Similarly, in the foregoing descriptions, it should be appreciated that the terms "forward (F)/rearward (R)/upward (U)/downward (D)/indoor (0/outdoor (0)" are generally defined as shown in the drawings. However, the terms are used merely to clearly understand the present disclosure, and therefore the above-mentioned directions may be differently defined.

It also should be understood that in the foregoing description, a thickness or size of each layer or element in the drawings may be modified, omitted, or schematically illustrated for convenience of description and clarity. Also, size or area of each constituent element does not entirely reflect the actual size thereof. In addition, angles and directions mentioned while explaining structures are based on the drawings. Therefore, if the reference points of angles or positional relationships are not clearly mentioned in the description, refer to the drawings.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A moving robot comprising:
    a body;
    a motor coupled to the body and configured to provide a driving force to move the moving robot;
    a sensor configured to detect respective boundary signals of a first travel area and a second travel area and a proximity boundary signal generated in a proximity boundary area which includes a portion of the first travel area and a portion of the second travel area that are positioned within a prescribed distance of each other; and
    a controller configured to:
        define a proximity boundary line based on the proximity boundary signal, and
        manage the motor such that the moving robot performs a homing travel from a location in the first travel area to a docking station, the homing travel including a first traveling portion that includes moving from the location in the first travel area to a boundary of the first travel area and following the boundary of the first travel area based on the boundary signal of the first travel area until sensor detects the proximity boundary signal, and a second traveling portion in the proximity boundary area and based on the proximity boundary line,
    wherein the controller is further configured to generate a random number that is less than a maximum threshold,
    wherein the controller is further configured to manage the motor such that, during the second traveling portion of the homing travel, the moving robot travels along a homing travel route which crosses the proximity boundary line one or more times,
    wherein the controller is further configured to manage the motor such that, during the second traveling portion of the homing travel, the moving robot enters the first travel area and the second travel area, alternatively,
    wherein the controller is further configured to:
        define a first homing boundary line and a second homing boundary line which are parallel to the proximity boundary line positioned therebetween; and
        control the motor such that, during the second traveling portion of the homing travel, the moving robot changes a direction of travel at the first and second homing boundary lines to cross the proximity boundary line one or more times, and wherein the sensor is further configured to detect a docking position signal generated in the docking station, and the controller is further configured to, when the docking position signal is detected or the moving robot crosses the proximity boundary line the random number of times during the second traveling portion of the homing travel, control the motor such that the moving robot performs a docking travel that includes moving toward the docking station.

2. The moving robot of claim 1, wherein the controller is further configured to perform the homing travel based on receiving a homing signal from a user.

3. The moving robot of claim 1, wherein the controller is further configured to manage the motor such that, during the homing travel, the moving robot changes direction of travel a random number of times within a homing travel area which is set within a threshold distance of the proximity boundary line.

4. The moving robot of claim 1, wherein the sensor is configured to distinguish the proximity boundary signal and the boundary signals of the first travel area and the second travel area based on differences in strengths of magnetic fields in the proximity boundary area and in the first travel area and the second travel area.

5. The moving robot of claim 1, wherein the sensor is further configured to distinguish the proximity boundary signal and boundary signals of the first travel area and the second travel area based on differences in distribution of magnetic fields in the proximity boundary area and in the first travel area and the second travel area.

6. The moving robot of claim 1, wherein the controller is further configured to:
perform the homing travel based on receiving a homing signal from a user; and
when the proximity boundary signal is not detected when the homing signal is received, control the motor such that the moving robot travels based on a boundary signal of the first travel area and a boundary signal of the second travel area.

7. A moving robot system comprising:
a first boundary wire and a second boundary wire positioned to respectively define a first travel area and a second travel area; and
a moving robot which includes:
a body,
a motor configured to provide a driving force to move the moving robot,
a sensor configured to detect a first boundary signal of the first boundary wire, a second boundary signal of the second boundary wire, and a proximity boundary signal generated by the first boundary wire and the second boundary wire in a proximity boundary area, and
a controller configured to:
determine a proximity boundary line based on the proximity boundary signal, and
manage the motor to apply the driving force such that the moving robot performs a homing travel from the first travel area to a docking station, the homing travel including a first traveling portion in which the moving robot follows the first boundary wire based on the sensor detecting the first boundary signal, and a second traveling based on the proximity boundary line when the sensor concurrently detects both the first and second boundary signals, wherein the controller is further configured to control the motor such that, during the second traveling portion of the homing travel, the moving robot travels along a homing travel route which crosses the proximity boundary line one or more times, wherein the controller is further configured to manage the motor such that, during the second traveling portion of the homing travel, the moving robot enters the first travel area and the second travel area, alternatively, wherein the controller is further configured to:
define a first homing boundary line and a second homing boundary line which are parallel to the proximity boundary line positioned therebetween; and
control the motor such that, during the second traveling portion of the homing travel, the moving robot changes a direction of travel at the first and second homing boundary lines to cross the proximity boundary line the one or more times, wherein one end of the proximity boundary area is positioned within a prescribed distance of the docking station, wherein the docking station includes a reference wire which extends in a vertical direction crossing the first and second boundary wires, and which generates a docking position signal, wherein the controller is further configured to generate a random number, and wherein the controller is further configured to, after a first occurring one of the docking position signal being detected or the moving robot crossing die proximity boundary line the random number of titres during the second traveling portion of the homing travel, control the motor such that the moving robot performs a docking travel that includes moving toward the docking station.

8. The robot system of claim 7, wherein the first boundary wire and the second boundary wire cross each other within the proximity boundary area.

9. The moving robot system of claim 7, wherein a portion of the first boundary wire and a portion of the second boundary wire are positioned parallel to each other within the proximity boundary area.

10. The moving robot system of claim 7, wherein the first boundary wire and the second boundary wire at least partially overlap each other within the proximity boundary area.

11. The moving robot system of claim 7,
wherein the docking station includes a first wire terminal and a second wire terminal which are connected to a power supply, and
wherein a first end of the first boundary wire and a first end of the second boundary wire are connected to the first wire terminal, and a second end of the first boundary wire and a second end of the second boundary wire are connected to the second wire terminal.

12. The moving robot of claim 1, wherein the sensor includes a magnetic field sensor, and the sensor is configured to distinguish the docking position signal and the proximity boundary signal based on differences in directions of magnetic fields associated with the docking position signal and the proximity boundary signal.

13. The moving robot system of claim 7, wherein the sensor includes a magnetic field sensor, and the sensor is configured to distinguish the docking position signal and the proximity boundary signal based on differences in directions of magnetic fields associated with the docking position signal and the proximity boundary signal.

* * * * *